US012066807B2

(12) United States Patent
Sagasaki et al.

(10) Patent No.: US 12,066,807 B2
(45) Date of Patent: Aug. 20, 2024

(54) NUMERICAL CONTROL DEVICE, MACHINE LEARNING DEVICE, AND NUMERICAL CONTROL METHOD

(71) Applicant: Mitsubishi Electric Corporation, Tokyo (JP)

(72) Inventors: Masakazu Sagasaki, Tokyo (JP); Yoshinori Yamada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 676 days.

(21) Appl. No.: 17/286,826

(22) PCT Filed: Oct. 24, 2019

(86) PCT No.: PCT/JP2019/041726
§ 371 (c)(1),
(2) Date: Apr. 20, 2021

(87) PCT Pub. No.: WO2020/085437
PCT Pub. Date: Apr. 30, 2020

(65) Prior Publication Data
US 2021/0382455 A1    Dec. 9, 2021

(30) Foreign Application Priority Data
Oct. 26, 2018 (WO) .................. PCT/JP2018/039906

(51) Int. Cl.
*G05B 19/18* (2006.01)
*G06N 20/00* (2019.01)
(52) U.S. Cl.
CPC .......... *G05B 19/182* (2013.01); *G06N 20/00* (2019.01); *G05B 2219/37346* (2013.01); *G05B 2219/37435* (2013.01)

(58) Field of Classification Search
CPC ........ G05B 19/182; G05B 2219/37346; G05B 2219/37435; G06N 20/00; B23Q 15/013
See application file for complete search history.

(56) References Cited

U.S. PATENT DOCUMENTS 3,813,745 A * 6/1974 Kuck ................... B23B 3/167
29/47
9,791,846 B2   10/2017 Watanabe et al.
(Continued)

FOREIGN PATENT DOCUMENTS

| JP | 56-76357 A | 6/1981 |
| JP | 2009-56569 A | 3/2009 |

(Continued)

OTHER PUBLICATIONS

German Office Action issued Dec. 23, 2022 in corresponding German Patent Application No. 11 2019 004 762.0 (with English translation), 20 pages.

(Continued)

*Primary Examiner* — Santosh R Poudel
(74) *Attorney, Agent, or Firm* — XSENSUS LLP

(57) ABSTRACT

A numerical control device includes a control computation unit controlling a spindle as a rotation axis of a workpiece, a first shaft driving a tool performing vibration cutting machining on the workpiece, and a second shaft driving a tool performing vibration cutting machining on the workpiece. The computation unit includes: a storage unit storing a machining program; a determination unit determining whether the number of vibrations of the first shaft and the second shaft follows a rotation speed of the spindle specified by the machining program; and a number-of-vibrations calculation unit that, in response to the determination that the number of vibrations of at least one of the first shaft and the second shaft does not follow the rotation speed of the (Continued)

spindle, calculates the number of vibrations following the rotation speed of the spindle for the drive shaft assessed as not following it.

7 Claims, 15 Drawing Sheets

(56) References Cited

U.S. PATENT DOCUMENTS

| | | | |
|---|---|---|---|
| 10,295,986 B2 | 5/2019 | Saitou et al. | |
| 10,414,009 B2 | 9/2019 | Kitakaze | |
| 2008/0281463 A1* | 11/2008 | Suh | G05B 19/4097 700/182 |
| 2010/0138047 A1* | 6/2010 | Bauer | G05B 19/4163 700/275 |
| 2013/0345851 A1* | 12/2013 | Kataoka | G05B 19/404 700/174 |
| 2015/0306720 A1* | 10/2015 | Ono | B23Q 17/0976 700/174 |
| 2015/0338842 A1* | 11/2015 | Ono | G05B 19/404 700/175 |
| 2015/0355624 A1 | 12/2015 | Irie et al. | |
| 2017/0322538 A1* | 11/2017 | Watanabe | G05B 19/4093 |
| 2018/0281090 A1* | 10/2018 | Watanabe | B23G 1/02 |
| 2019/0196451 A1 | 6/2019 | Kakimoto | |
| 2019/0391558 A1* | 12/2019 | Kawai | G05B 19/404 |
| 2021/0382455 A1 | 12/2021 | Sagasaki et al. | |

FOREIGN PATENT DOCUMENTS

| | | |
|---|---|---|
| JP | 2010-257388 A | 11/2010 |
| JP | 5599523 B1 | 10/2014 |
| JP | 2015-230655 A | 12/2015 |
| JP | 2016-182652 A | 10/2016 |
| JP | 2016-182655 A | 10/2016 |
| JP | 2018-5423 A | 1/2018 |
| JP | 2018-41208 A | 3/2018 |
| JP | 2018-43306 A | 3/2018 |
| JP | 2019-101680 A | 6/2019 |
| JP | 2019-117516 A | 7/2019 |
| WO | 2018/181447 A1 | 10/2018 |
| WO | 2020/085437 A1 | 4/2020 |

OTHER PUBLICATIONS

Kim, Dong-Hyeon, et al. "Smart Machining Process Using Machine Learning: A Review and Perspective on Machining Industry", Int. Journal of Precision Engineering and Manufacturing-Green Technology, vol. 5, Aug. 2018, No. 4, pp. 555-568. URL: doi.org/10.1007/s40684-18-0057-y.

Office Action issued on May 10, 2022, in corresponding Japanese patent Application No. 2021-096503, 5 pages.

International Search Report and Written Opinion mailed on Jan. 21, 2020, received for PCT Application PCT/JP2019/041726, Filed on Oct. 24, 2019, 11 pages including English Translation.

Notice of Reasons for Refusal mailed on Oct. 20, 2020, received for JP Application 2020-536907, 14 pages Including English Translation.

* cited by examiner

FIG.5
```
                                                  ⌐82P
$1(FIRST SHAFT SIDE)   │ $2(SECOND SHAFT SIDE)
  M3 S1=3000           │   :
  :                    │
  G0 X10. Z50. ;       │   G0 X5. Z60. ;
  :                    │   :
  G165 A0.2 D5.5 ;     │   G165 A0.3 D6.5 ;
  !2 L1                │   !1 L1
  G1 Z10. F0.5         │   G1 Z15. F0.5
  :                    │   :
  !2 L2                │   !1 L2
  :                    │   :
      )                        )
     812A                     812B
```
```
                                                  ⌐82Q
$1(FIRST SHAFT SIDE)   │ $2(SECOND SHAFT SIDE)
  M3 S1=3000           │   :
  :                    │
  G0 X10. Z50. ;       │   G0 X5. Z60. ;
  :                    │   :
  G165 A0.2 D0.5 ;     │   G165 A0.3 D1.5 ;
  !2 L1                │   !1 L1
  G1 Z10. F0.5         │   G1 Z15. F0.5
  :                    │   :
  !2 L2                │   !1 L2
  :                    │   :
      )                        )
     813A                     813B
```

FIG.10

```
$1(FIRST SHAFT SIDE)        $2(SECOND SHAFT SIDE)
  M3 S1=3000                  :
  :                           
  G0 X10. Z50. ;              G0 X5. Z60. ;
  :                           :
a1---G165 A0.2 D0.5 ;         G165 A0.3 D1.5 ;---b1
a2---G1 Z10. F0.5 ;           G1 Z15. F0.5 ;---b2
a3---!2 L1        ;           !1 L1        ;---b3
  G1 X15. F0.5 ;              G1 X5. Z10. F0.5 ;
  :                           :
  G0 X20                      G0 X15
```

816A     816B

NUMERICAL CONTROL DEVICE, MACHINE LEARNING DEVICE, AND NUMERICAL CONTROL METHOD

CROSS-REFERENCE TO RELATED APPLICATIONS

The present application is based on PCT filing PCT/JP2019/041726, filed Oct. 24, 2019, which claims priority to PCT/JP2018/039906, filed Oct. 26, 2018, the entire contents of each are incorporated herein by reference.

FIELD

The present invention relates to a numerical control device, a machine learning device, and a numerical control method for controlling vibration cutting with a tool being vibrated.

BACKGROUND

In a field of lathe turning, a numerical control device is used to control the operation of a tool according to a machining program for machining a workpiece, thereby causing the tool to machine the workpiece. Some of numerical control devices are configured to cause a workpiece to be subjected to vibration cutting while vibrating a tool at a specific frequency along a tool path.

A numerical control device described in Patent Literature 1 calculates a command movement amount per unit time from a movement command for a tool, calculates a vibration movement amount per unit time from a vibration condition, and calculates a combined movement amount by combining the command movement amount and the vibration movement amount, so as to control vibration cutting based on the combined movement amount.

CITATION LIST

Patent Literature

Patent Literature 1: Japanese Patent No. 5599523

SUMMARY

Technical Problem

However, the technique of Patent Literature 1 is intended for controlling a machine tool having a single drive shaft provided to drive a tool, and thus it has not been adapted for executing vibration cutting for a machine tool that machines one rotating workpiece using two or more drive shafts provided to drive two or more tools, respectively.

The present invention has been made in view of the above circumstances, and an object thereof is to provide a numerical control device capable of executing vibration cutting for a machine tool that machines one rotating workpiece using two or more drive shafts that drive two or more tools, respectively.

Solution to Problem

In order to solve the above-mentioned problem and achieve the object, the present invention provides a numerical control device comprising a control computation unit to control a spindle that is a rotation axis of a machining target, a first drive shaft to drive a first tool to perform vibration cutting machining on the machining target, and a second drive shaft to drive a second tool to perform vibration cutting machining on the machining target, wherein the control computation unit comprises: a storage unit to store a machining program for performing vibration cutting machining on the machining target; a determination unit to determine whether the numbers of vibrations of the first drive shaft and the second drive shaft follow a rotation speed of the spindle specified by the machining program; and a number of vibrations calculation unit to, in response to the determination unit determining that the number of vibrations of at least one of the first drive shaft and the second drive shaft does not follow the rotation speed of the spindle, calculate the number of vibrations that follows the rotation speed of the spindle for the drive shaft assessed as not following the rotation speed of the spindle.

Advantageous Effects of Invention

The numerical control device according to the present invention can achieve an advantageous effect that vibration cutting can be executed for a machine tool that machines one rotating workpiece using two or more drive shafts provided to drive two or more tools, respectively.

BRIEF DESCRIPTION OF DRAWINGS

FIG. 5 is a diagram illustrating a second example of a machining program for use in the numerical control device according to the first embodiment.

FIG. 10 is a diagram illustrating a first example of a machining program for use in the numerical control device according to the third embodiment.

DESCRIPTION OF EMBODIMENTS

Hereinafter, a numerical control device, a machine learning device, and a numerical control method according to embodiments of the present invention will be described in detail with reference to the drawings. The present invention is not necessarily limited by these embodiments.

First Embodiment

Figure 1:
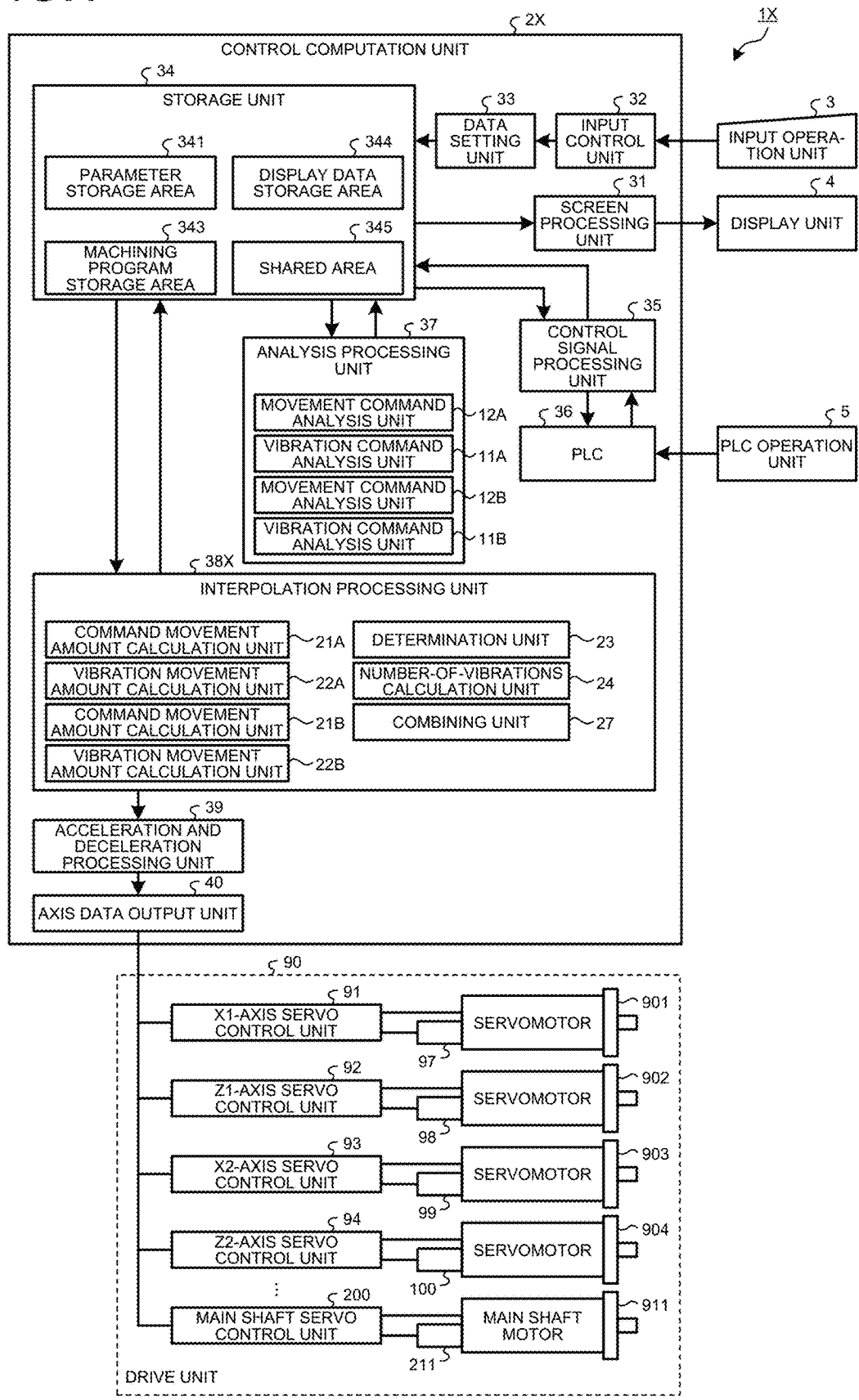
FIG. 1 is a diagram illustrating an exemplary configuration of a numerical control device according to a first embodiment.
Figure 2:
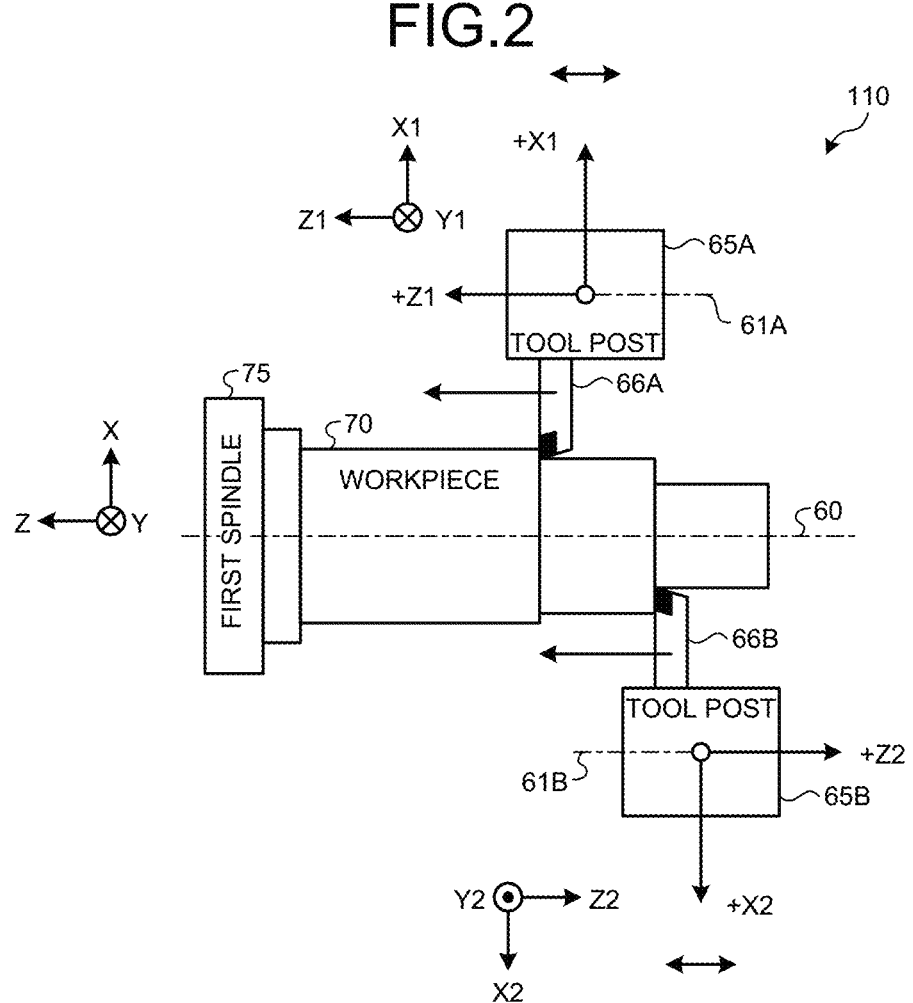
FIG. 2 is a diagram illustrating a configuration of a machine tool according to the first embodiment.

FIG. 1 is a diagram illustrating an exemplary configuration of a numerical control device according to the first embodiment. FIG. 2 is a diagram illustrating a configuration of a machine tool according to the first embodiment. In FIG. 2, a lateral direction on a paper surface is a Z-axis direction, and a longitudinal direction on the paper surface is an X-axis direction. X1 and X2 axes are axes parallel to the X axis, Y1 and Y2 axes are axes parallel to the Y axis, and Z1 and Z2 axes are axes parallel to the Z axis.

The numerical control (NC) device 1X is a computer that executes control for low-frequency vibration cutting that is machining with vibrating tools 66A and 66B, on a machine tool 110 that performs lathe machining. In the following description, low-frequency vibration may be simply referred to as vibration.

The numerical control device 1X controls the machining of a workpiece 70 that is a machining target, while relatively moving a first tool and the workpiece 70 using one or more drive shafts including a first drive shaft, and further relatively moving a second tool and the workpiece 70 using one or more drive shafts including a second drive shaft. That is, the numerical control device 1X has the first drive shaft that moves the first tool or the workpiece 70 and the second drive shaft that moves the second tool or the workpiece 70 so that vibration cutting is performed on the workpiece 70 using the first tool and the second tool simultaneously. In the first embodiment, because vibration cutting is performed with respect to the two drive shafts, the numerical control device 1X controls the vibration of each drive shaft or the rotation of the workpiece 70 in compliance with the constraint conditions for implementing the vibration cutting.

The numerical control device 1X controls the machine tool 110 having a single spindle 60, the first drive shaft, and the second drive shaft. The spindle 60 serves as a rotation axis of the workpiece 70. The first drive shaft is provided to move the tool 66A that is the first tool. The second drive shaft is provided to move the tool 66B that is the second tool. The workpiece 70 that is a machining target is an object to be machined by the machine tool 110. The following description refers to a case where the first drive shaft is a first shaft 61A and the second drive shaft is a second shaft 61B. In FIG. 2, a center line of the spindle 60 is illustrated for the spindle 60.

The numerical control device 1X includes a control computation unit 2X, an input operation unit 3, a display unit 4, and a programmable logic controller (PLC) operation unit 5 such as a machine console panel for operating a PLC 36. FIG. 1 depicts a drive unit 90 that is a constituent element of the machine tool 110.

The drive unit 90 drives a first-system tool post 65A, a second-system tool post 65B, and the like included in the machine tool 110. The drive unit 90 is a drive mechanism configured to drive the two tools 66A and 66B while rotating the workpiece 70. The drive unit 90 moves the tool 66A along the X1-axis direction and the Z1-axis direction that is an axial direction of the first shaft 61A, and moves the tool 66B along the X2-axis direction and the Z2-axis direction that is an axial direction of the second shaft 61B. The first embodiment refers to a case where the vibration direction of the tool 66A is an axial direction of the first shaft 61A and the vibration direction of the tool 66B is an axial direction of the second shaft 61B. Note that the axial directions vary depending on the device configuration, and thus are not limited to the above directions.

The drive unit 90 includes servomotors 901 to 904 that move the tools 66A and 66B in different axial directions specified on the numerical control device 1X, and detectors 97 to 100 that detect the positions and speeds of the servomotors 901 to 904, respectively. The drive unit 90 also includes servo control units for different axial directions, which is configured to control the servomotors 901 to 904 based on a command from the numerical control device 1X. The servo control units for different axial directions perform feedback control for the servomotors 901 to 904 based on the positions and speeds from the detectors 97 to 100.

An X1-axis servo control unit 91 of the servo control units controls the operation of the tool 66A in the X1-axis direction by controlling the servomotor 901. The Z1-axis servo control unit 92 thereof controls the operation of the tool 66A in the Z1-axis direction by controlling the servomotor 902. The X2-axis servo control unit 93 thereof controls the operation of the tool 66B in the X2-axis direction by controlling the servomotor 903. The Z2-axis servo control unit 94 thereof controls the operation of the tool 66B in the Z2-axis direction by controlling the servomotor 904. In a case where the machine tool 110 has three tool posts, the drive unit 90 further includes an X3-axis servo control unit that controls the operation in the X3-axis direction parallel to the X-axis direction, and a Z3-axis servo control unit that controls the operation in the Z3-axis direction parallel to the Z-axis direction. In this case, the X3-axis servo control unit controls one servomotor equipped with a detector, and the Z3-axis servo control unit controls one servomotor equipped with a detector.

The drive unit 90 also includes a spindle motor 911 that rotates the spindle 60 for rotating the workpiece 70, and a detector 211 that detects the position and rotation speed of the spindle motor 911. The rotation speed detected by the detector 211 corresponds to the number of rotations of the spindle motor 911.

The drive unit 90 also includes a spindle servo control unit 200 that is configured to control the spindle motor 911 based on a command from the numerical control device 1X. The spindle servo control unit 200 performs feedback control for the spindle motor 911 based on the position and speed from the detector 211. In the first embodiment, the number of rotations of the spindle 60 per unit time is referred to as a spindle rotation speed. The spindle rotation speed is, for example, the number of rotations of the spindle 60 per minute. That is, the spindle rotation speed corresponds to a rotation rate of the spindle.

In a case where the machine tool 110 machines two workpieces 70 simultaneously, the drive unit 90 is provided with two sets each having a spindle motor 911, a detector 211, and a spindle servo control unit 200.

The input operation unit 3 is a means for inputting information to the control computation unit 2X. The input operation unit 3 is configured by an input means such as a keyboard, a button, or a mouse, which is configured to receive an input such as a command to the numerical control device 1X from a user, a machining program, a parameter, or the like to input the received one to the control computation unit 2X. The display unit 4 is configured by a display means such as a liquid crystal display device, which displays information processed by the control computation unit 2X on a display screen thereof. The PLC operation unit 5 receives an operation from the user, and sends an instruction corresponding to the operation to the PLC 36.

The control computation unit 2X serving as a control unit includes an input control unit 32, a data setting unit 33, a storage unit 34, a screen processing unit 31, an analysis processing unit 37, a control signal processing unit 35, the PLC 36, an interpolation processing unit 38X, an acceleration and deceleration processing unit 39, and an axis data output unit 40. Note that the PLC 36 may be placed outside the control computation unit 2X.

The storage unit 34 includes a parameter storage area 341, a machining program storage area 343, a display data storage area 344, and a shared area 345. In the parameter storage area 341, parameters and the like to be used in the processing of the control computation unit 2X are stored. Specifically, in the parameter storage area 341, control parameters, servo parameters, and tool data for operating the numerical control device 1X are stored. In the machining program storage area 343, a machining program for use in the machining of the workpiece 70 is stored. A machining program according to the first embodiment includes a vibration command, i.e. a command to vibrate the tool 66A or 66B, and a movement command, i.e. a command to move the tool 66A or 66B.

In the display data storage area 344, screen display data used for display on the display unit 4 is stored. The screen display data are data for displaying information on the display unit 4. The storage unit 34 also includes the shared area 345 in which data to be temporarily used is stored.

The screen processing unit 31 performs control to cause the display unit 4 to display the screen display data stored in the display data storage area 344. The input control unit 32 receives information inputted from the input operation unit 3. The data setting unit 33 causes the storage unit 34 to store the information received by the input control unit 32. That is, the input information received by the input operation unit 3 is written in the storage unit 34 via the input control unit 32 and the data setting unit 33.

The control signal processing unit 35 is connected to the PLC 36, and receives, from the PLC 36, signal information on a relay or the like for operating a mechanism of the machine tool 110. The control signal processing unit 35 writes pieces of the received signal information to the shared area 345 of the storage unit 34. These signal information pieces are referred to by the interpolation processing unit 38X during a machining operation. In addition, when the analysis processing unit 37 outputs an auxiliary command to the shared area 345, the control signal processing unit 35 reads the auxiliary command from the shared area 345, and sends the auxiliary command to the PLC 36. The auxiliary command is a command other than a command to operate a drive shaft corresponding to an numerical control axis. An example of the auxiliary command is M code or T code, which will be described later.

In response to an operation to the PLC operation unit 5, the PLC 36 executes an operation according to this operation. The PLC 36 stores therein a ladder program in which machine operations are described. In response to receiving a T code or M code that is an auxiliary command, the PLC 36 executes, for the machine tool 110, the process corresponding to the auxiliary command in accordance with the ladder program. After executing the process corresponding to the auxiliary command, the PLC 36 sends a completion signal indicating the completion of the machine control to the control signal processing unit 35 in order to cause the next block of the machining program to be executed.

In the control computation unit 2X, the control signal processing unit 35, the analysis processing unit 37, and the interpolation processing unit 38X are connected via the storage unit 34 so as to write and read information via the storage unit 34. Any process of writing and reading information in the control signal processing unit 35, the analysis processing unit 37, and the interpolation processing unit 38X involves interposition of the storage unit 34, but such interposition may be omitted in the following description.

A machining program is selected by the user inputting a machining program number in the input operation unit 3. The machining program number is written in the shared area 345 via the input control unit 32 and the data setting unit 33. Using a cycle start on the machine console panel or the like as a trigger, the analysis processing unit 37 receives, from the shared area 345, workpiece specification information that specifies the workpiece 70 corresponding to the selected machining program number in the shared area 345, and upon the reception the analysis processing unit 37 reads the machining program corresponding to the workpiece specification information from the machining program storage area 343, and performs analysis processing for each block (each row) of the machining program. The analysis processing unit 37 analyzes, for example, a G code (command related to shaft movement or the like), a T code (tool change command or the like), an S code (spindle motor rotation speed command), and an M code (machine operation command).

In a case where the analyzed row contains an M code or T code, the analysis processing unit 37 sends a analysis result to the PLC 36 via the shared area 345 and the control signal processing unit 35. In a case where the analyzed row contains an M code, the analysis processing unit 37 sends the M code to the PLC 36 via the control signal processing unit 35. The PLC 36 executes the machine control corresponding to the M code. Upon completion of the execution, the result indicating the completion of the M code is written to the storage unit 34 via the control signal processing unit 35. The interpolation processing unit 38X refers to the execution result written to the storage unit 34.

In a case where a G code is contained, the analysis processing unit 37 sends the analysis result to the interpolation processing unit 38X via the shared area 345. Specifically, the analysis processing unit 37 generates a movement condition corresponding to the G code, and sends the movement condition to the interpolation processing unit 38X. The analysis processing unit 37 also sends the spindle rotation speed specified by an S code to the interpolation processing unit 38X. A movement condition is a tool feed condition for moving the machining position of the tool 66A or 66B, which is represented by a speed for moving the tool post 65A or 65B, a position to which the tool post 65A or 65B is moved, and the like. For example, in the tool feed of the tool 66A, the tool 66A is advanced in the axial direction of the first shaft 61A, and in the tool feed for the tool 66B, the tool 66B is advanced in the axial direction of the second shaft 61B.

The analysis processing unit 37 includes vibration command analysis units 11A and 11B and movement command analysis units 12A and 12B. The vibration command analysis unit 11A is a means for analyzing a vibration command for the first shaft 61A, and the vibration command analysis unit 11B is a means for analyzing a vibration command for the second shaft 61B.

The vibration command analysis unit 11A analyzes a vibration command contained in a machining program for the first shaft 61A (such as a machining program 810A described later) to generate a vibration condition for the first shaft 61A, and sends the generated vibration condition to the interpolation processing unit 38X via the shared area 345.

The vibration command analysis unit 11B analyzes a vibration command contained in a machining program for the second shaft 61B (such as a machining program 810B described later) to generate a vibration condition for the second shaft 61B, and sends the generated vibration condition to the interpolation processing unit 38X via the shared area 345.

The movement command analysis unit 12A analyzes a movement command contained in a machining program for the first shaft 61A to generate a movement condition for the first shaft 61A, and sends the generated movement condition to the interpolation processing unit 38X via the shared area 345.

The movement command analysis unit 12B analyzes a movement command contained in a machining program for the second shaft 61B to generate a movement conditions for the second shaft 61B, and sends the generated movement condition to the interpolation processing unit 38X via the shared area 345.

That is, the movement command analysis units 12A and 12B generate movement conditions corresponding to G codes, and send the movement conditions to the interpolation processing unit 38X. Examples of the movement conditions include the movement speed of a tool post, the position to which a tool post is moved, and the like.

A vibration command for the first shaft 61A is a command to vibrate the first shaft 61A in the Z1-axis direction that is an axial direction of the first shaft 61A, and a vibration command for the second shaft 61B is a command to vibrate the second shaft 61B in the X2-axis direction and the Z2-axis direction that is an axial direction of the second shaft 61B. The vibration condition is a condition of vibration for executing vibration cutting. A vibration condition according to the first embodiment is the number of vibrations at the time of vibration cutting. The number of vibrations of the first shaft 61A corresponds to the number of times the first shaft 61A vibrates during one rotation of the spindle 60, and the number of vibrations of the second shaft 61B corresponds to the number of times the second shaft 61B vibrates during one rotation of the spindle 60. In other words, the number of vibrations of the first shaft 61A and the number of vibrations of the second shaft 61B each correspond to a frequency of vibration with respect to a period of time in which the spindle 60 rotates one revolution. Therefore, it can be said that a vibration condition according to the first embodiment is a frequency of vibration in the vibration cutting.

In the machine tool 110, because the first shaft 61A vibrates, the number of vibrations of the first shaft 61A corresponds to the number of vibrations of the tool 66A on the first shaft 61A side. In the machine tool 110, because the second shaft 61B vibrates, the number of vibrations of the second shaft 61B corresponds to the number of vibrations of the tool 66B on the second shaft 61B side. In the machine tool 110, the number of vibrations of the first shaft 61A is a first number of vibrations, and the number of vibrations of the second shaft 61B is a second number of vibrations.

The interpolation processing unit 38X includes command movement amount calculation units 21A and 21B, vibration movement amount calculation units 22A and 22B, a determination unit 23, a number-of-vibrations calculation unit 24, and a combining unit 27. The number-of-vibrations calculation unit 24 of the interpolation processing unit 38X changes at least one of the spindle rotation speed, the number of vibrations of the first shaft 61A, and the number of vibrations of the second shaft 61B so as to cause the vibration of the first shaft 61A and the vibration of the second shaft 61B to be synchronized with and follow the spindle rotation speed.

For example, the interpolation processing unit 38X determines whether to change the number of vibrations of the first shaft 61A and the number of vibrations of the second shaft 61B, and changes the number of vibrations of the shaft to be changed as a result of the determination to the number of vibrations according to the spindle rotation speed. In this case, the interpolation processing unit 38X changes the number of vibrations so that the vibration of each shaft can be synchronized with and follow the spindle rotation speed.

The process of synchronizing the vibration of the first shaft 61A with the spindle rotation speed is a process of adjusting the number of vibrations of the first shaft 61A so that the number of vibrations of the first shaft 61A during one rotation of the spindle 60 is equal to a fixed number of vibrations. The process of synchronizing the vibration of the second shaft 61B with the spindle rotation speed is a process of adjusting the number of vibrations of the second shaft 61B so that the number of vibrations of the second shaft 61B during one rotation of the spindle 60 is equal to a fixed number of vibrations. In other words, the process of synchronizing the vibration of the first shaft 61A with the spindle rotation speed corresponds to a process of synchronizing the vibrational frequency (the number of vibrations) of the first shaft 61A with the spindle rotation speed, and the process of synchronizing the vibration of the second shaft 61B with the spindle rotation speed corresponds to a process of synchronizing the vibrational frequency of the second shaft 61B with the spindle rotation speed.

In the first embodiment, because the vibration of the first shaft 61A is defined by the number of vibrations, the synchronization of the vibration of the first shaft 61A with the spindle rotation speed may be referred to as synchronization of the number of vibrations of the first shaft 61A with the spindle rotation speed. Similarly, in the first embodiment, because the vibration of the second shaft 61B is defined by the number of vibrations, the synchronization of the vibration of the second shaft 61B with the spindle rotation speed may be referred to as synchronization of the number of vibrations of the second shaft 61B with the spindle rotation speed.

Note that the fixed number of vibrations in the first shaft 61A is variable, for which a number depending on the vibration cutting based on the first shaft 61A and the second shaft 61B can be selected. Similarly, the fixed number of vibrations in the second shaft 61B is variable, for which a number depending on the vibration cutting based on the first shaft 61A and the second shaft 61B can be selected.

The interpolation processing unit 38X reads, from the shared area 345, the spindle rotation speed, the number of vibrations of the first shaft 61A, and the number of vibrations of the second shaft 61B.

The command movement amount calculation units 21A and 21B each receive a movement condition as an analysis result from the analysis processing unit 37, perform interpolation processing for the movement condition, and send a command movement amount per unit time corresponding to the interpolation processing result to the combining unit 27. Specifically, the command movement amount calculation unit 21A calculates a command movement amount by which the tool post 65A is moved in a unit time, based on the movement condition for the first shaft 61A analyzed by the analysis processing unit 37, and sends the command movement amount to the combining unit 27. The command movement amount calculation unit 21B calculates a command movement amount by which the tool post 65B is moved in a unit time, based on the movement condition for the second shaft 61B analyzed by the analysis processing unit 37, and sends the command movement amount to the combining unit 27.

The determination unit 23 determines which of the number of vibrations of the first shaft 61A and the number of vibrations of the second shaft 61B is to be adjusted, based on the spindle rotation speed, the number of vibrations of the first shaft 61A, and the number of vibrations of the second shaft 61B. When the determination unit 23 acquires frequencies instead of the numbers of vibrations, the determination unit 23 calculates the number of vibrations based on the frequencies in advance. In order to efficiently separate chips in the vibration cutting, the number of vibrations of each of the tools 66A and 66B during one rotation of the spindle 60 requires not to be a natural number of times, and is desirably about (0.5+N) times (N is 0 or a natural number). Here, the said "efficiently separate chips" means to make shorter chips on average, not to make chips with varying lengths.

That is, in order to make chips as short as possible on average, it is desirable that the number of vibrations of each of the tools 66A and 66B be about the sum of 0.5 and 0 or a natural number. Hereinafter, the number of vibrations when the number of vibrations of the tool 66A or 66B during one rotation of the spindle 60 is (0.5+N) times is referred to as a specific number of vibrations. An example of the number of vibrations that synchronizes with the spindle rotation speed is a specific number of vibrations. A case where the number of vibrations of the tool 66A or 66B during one rotation of the spindle 60 is (0.5+N) times means that the number of vibrations of the tool is synchronized with the spindle.

However, even at the number of vibrations different from but close to the specific number of vibrations, it is possible to perform vibration cutting while chips are made separated. The specific number of vibrations only needs to be about (0.5+N) times, and some deviation therefrom is acceptable. In the case of deviation from (0.5+N) times, the lengths of chips vary somewhat widely, but it is still acceptable as long as no substantial influence is caused, such as a complete failure in separating chips or a large variation in the order of ±50% in lengths of chips, for example. That is, the number of vibrations of each of the first shaft 61A and the second shaft 61B is preferably determined based on the specific number of vibrations.

The determination unit 23 selects, as an adjustment target, the number of vibrations of a drive shaft that cannot follow the spindle rotation speed or does not reach the specific number of vibrations. The determination unit 23 may select a drive shaft that is significantly deviated from the number of vibrations that can follow the spindle rotation speed, or may select a drive shaft that is significantly deviated from the specific number of vibrations.

For example, in a case where the number of vibrations of the first shaft 61A is 1.5 times, the number of vibrations of the first shaft 61A is the specific number of vibrations because of 1.5=(0.5+1). In a case where the number of vibrations of the second shaft 61B is 6.5 times, the number of vibrations of the second shaft 61B is also the specific number of vibrations because of 6.5=(0.5+6). Suppose that the frequency of the first shaft 61A is a frequency (for example, 25 Hz) that can follow the spindle rotation speed, and the frequency of the second shaft 61B exceeds a frequency (for example, 100 Hz) that can follow the spindle rotation speed. In this case, the determination unit 23 selects the number of vibrations of the second shaft 61B as an adjustment target. The determination unit 23 sends the determination result to the number-of-vibrations calculation unit 24. The determination unit 23 also sends the spindle rotation speed to the acceleration and deceleration processing unit 39.

The number-of-vibrations calculation unit 24 adjusts the number of vibrations of the drive shaft based on the vibrational frequency and the spindle rotation speed so that the number of vibrations is equal to the specific number of vibrations and can follow the spindle rotation speed.

Suppose that a specific number of vibrations that can follow the spindle rotation speed is 0.5 or 1.5 times. That is, suppose that a vibrational frequency that can follow the spindle rotation speed is a frequency corresponding to 0.5 or 1.5 times of the specific number of vibrations.

After the second shaft 61B is selected by the determination unit 23, the number-of-vibrations calculation unit 24 sets 0.5 or 1.5 times as the number of vibrations of the second shaft 61B. For example, the number-of-vibrations calculation unit 24 sets, as the number of vibrations of the second shaft 61B, one of two or more candidates for the number of vibrations, which is closest to the initial number of vibrations. That is, the number-of-vibrations calculation unit 24 changes the number of vibrations by selecting the candidate that makes a difference between before and after the change in the number of vibrations smallest.

The number-of-vibrations calculation unit 24 sends the adjusted number of vibrations and the unadjusted number of vibrations to the vibration movement amount calculation unit 22B in association with the first shaft 61A or the second shaft 61B. The following description is based on the assumption that the number of vibrations of the second shaft 61B is adjusted.

The vibration movement amount calculation unit 22A calculates the vibration movement amount of the first shaft 61A based on the number of vibrations of the first shaft 61A sent from the number-of-vibrations calculation unit 24 or the vibration condition for the first shaft 61A in the shared area 345. The vibration movement amount of the first shaft 61A is a movement amount in a unit time for vibrating the tool 66A. The vibration movement amount calculation unit 22A sends the calculated vibration movement amount of the first shaft 61A to the combining unit 27.

The vibration movement amount calculation unit 22B calculates the vibration movement amount of the second shaft 61B based on the number of vibrations of the second shaft 61B sent from the number-of-vibrations calculation unit 24 or the vibration condition for the second shaft 61B in the shared area 345. The vibration movement amount of the second shaft 61B is a movement amount in a unit time for vibrating the tool 66B. The vibration movement amount calculation unit 22B sends the calculated vibration movement amount of the second shaft 61B to the combining unit 27.

The movement of each of the tool 66A and 66B corresponds to the sum of the movement for vibration cutting and the movement in a direction (cutting direction) in which the machining proceeds relative to the workpiece 70. In the first embodiment, the cutting direction is the Z-axis direction in FIG. 2. Therefore, the combining unit 27 adds up the vibration movement amount for vibration cutting and the movement amount in the cutting direction for proceeding with the machining for the workpiece 70.

Specifically, the combining unit 27 generates a combined movement amount by combining the command movement amount sent from the command movement amount calculation unit 21A and the vibration movement amount sent from the vibration movement amount calculation unit 22A. Note that the vibration movement amount may be represented in a waveform. In this case, the combined movement amount may also be represented in a waveform. The combining unit 27 sends the combined movement amount that is the result of the interpolation processing, to the acceleration and deceleration processing unit 39. Specifically, the combining unit 27 sends the combined movement amount for the first shaft 61A and the combined movement amount for the second shaft 61B to the acceleration and deceleration processing unit 39.

The acceleration and deceleration processing unit 39 performs acceleration and deceleration processing for smoothly changing an acceleration based on the result of the interpolation processing supplied from the interpolation processing unit 38X. The acceleration and deceleration processing unit 39 performs acceleration and deceleration processing for the start and stop of the movement. Specifically, the acceleration and deceleration processing unit 39 generates a movement command for the first shaft 61A based on the combined movement amount for the first shaft 61A, and generates a movement command for the second shaft 61B based on the combined movement amount for the second shaft 61B. The movement commands processed by the acceleration and deceleration processing unit 39 are speed commands per unit time. The acceleration and deceleration processing unit 39 generates acceleration and deceleration commands for the X1 axis, the X2 axis, the Z1 axis, and the Z2 axis.

The acceleration and deceleration processing unit 39 sends the speed commands that are the processing result of the acceleration and deceleration processing, to the axis data output unit 40. Note that the acceleration and deceleration processing unit 39 does not perform acceleration and deceleration processing on the spindle rotation speed. The acceleration and deceleration processing unit 39 sends a rotation speed command corresponding to the spindle rotation speed to the axis data output unit 40. The rotation speed command generated by the acceleration and deceleration processing unit 39 is a step command.

The axis data output unit 40 outputs the speed commands to the drive unit 90. Specifically, the axis data output unit 40 outputs the speed command for the X1 axis to the X1-axis servo control unit 91, and outputs the speed command for the Z1 axis to the Z1-axis servo control unit 92. The axis data output unit 40 also outputs the speed command for the X2 axis to the X2-axis servo control unit 93, and outputs the speed command for the Z2 axis to the Z2-axis servo control unit 94. The axis data output unit 40 also outputs the rotation speed command for the spindle 60 to the spindle servo control unit 200. As a result, the X1-axis servo control unit 91, the Z1-axis servo control unit 92, the X2-axis servo control unit 93, the Z2-axis servo control unit 94, and the spindle servo control unit 200 control the operation of the tool 66A in the X1-axis direction and the Z1-axis direction, the operation of the tool 66B in the X2-axis direction and the Z2-axis direction, and the rotation operation of the spindle 60.

Here, an outline of the operation procedure for machining control performed by the numerical control device 1X will be described. At the start of machining performed by the machine tool 110, the PLC 36 outputs a cycle start signal to the control signal processing unit 35, and the control signal processing unit 35 outputs the cycle start signal to the interpolation processing unit 38X. As a result, the interpolation processing unit 38X activates the analysis processing unit 37.

After that, the analysis processing unit 37 reads and analyzes the machining program block by block, and stores the analysis result, namely vibration conditions, movement conditions, and spindle rotation speed in the shared area 345. Then, the interpolation processing unit 38X calculates a combined movement amount per unit time for the first shaft 61A and a combined movement amount per unit time for the second shaft 61B based on the analysis result from the analysis processing unit 37, and sends the combined movement amounts to the acceleration and deceleration processing unit 39.

As a result, the acceleration and deceleration processing unit 39 generates an acceleration and deceleration movement command for each axis based on the combined movement amounts from the interpolation processing unit 38X. These movement commands are outputted from the axis data output unit 40 to the drive unit 90, and the drive unit 90 controls the operation of each axis according to the movement command.

As illustrated in FIG. 2, the machine tool 110 according to the first embodiment is a one-spindle two-post lathe including the first shaft 61A on the tool post 65A and the second shaft 61B on the tool post 65B. A one-spindle two-post lathe is a lathe equipped with a single spindle and two tool posts. The tool posts 65A and 65B are also called turrets. An example of the machine tool 110 is a turret lathe.

The machine tool 110 includes a headstock equipped with a first spindle 75. The first spindle 75 rotates with the workpiece 70 attached thereto, thereby rotating the workpiece 70. The rotation axis of the workpiece 70 formed by the first spindle 75 is the spindle 60 provided on the headstock.

The machine tool 110 includes the tool post 65A that is a first tool post, and the tool post 65B that is a second tool post. The first shaft 61A is provided on the tool post 65A, and the second shaft 61B is provided on the tool post 65B. The tool post 65A is movable in the X1-axis direction and the Z1-axis direction, and the tool post 65B is movable in the X2-axis direction and the Z2-axis direction. In the machine tool 110, the Z1 axis corresponds to the first shaft 61A and the Z2 axis corresponds to the second shaft 61B.

The tool post 65A is a tool post for the first shaft 61A, and the tool post 65B is a tool post for the second shaft 61B. The tool posts 65A and 65B are swivel tool posts. The tool post 65A can be equipped with a plurality of tools 66A, and one of the tools 66A to be used is changed to the other by the tools 66A being turned. Similarly, the tool post 65B can be equipped with a plurality of tools 66B, and one of the tools 66B to be used is changed to the other by the tools 66B being turned.

By the tool post 65A vibrating in the Z1-axis direction, the tool 66A performs vibration cutting machining on the workpiece 70. By the tool post 65B vibrating in the Z2-axis direction, the tool 66B performs vibration cutting machining on the workpiece 70. In the first embodiment, for convenience of explanation, the vibration of the tool post 65A may be described as the vibration of the tool 66A. Similarly, the vibration of the tool post 65B may be described as the vibration of the tool 66B.

Vibration conditions for the machine tool 110 in the first embodiment are set to the following (L1-1) to (L1-2). Note that these vibration conditions are examples of conditions for achieving high finishing precision of the machining target and fine separation of chips.

(L1-1) The numbers of vibrations of the tools 66A and 66B during one rotation of the spindle 60 shall be equal to each other for the first shaft 61A and the second shaft 61B. Both the first shaft 61A and the second shaft 61B are subjected to operation at the number of vibrations synchronized with the spindle rotation speed during vibration cutting.

(L1-2) The amplitudes of vibration shall be equal to each other for the first shaft 61A and the second shaft 61B.

Although the conditions (L1-1) and (L1-2) specify that the number of vibrations and the amplitude can be the same for the first shaft 61A and the second shaft 61B, they may be different therefor. This is because the vibration of the first shaft 61A is not transmitted to the second shaft 61B in the machine tool 110.

Figure 3:
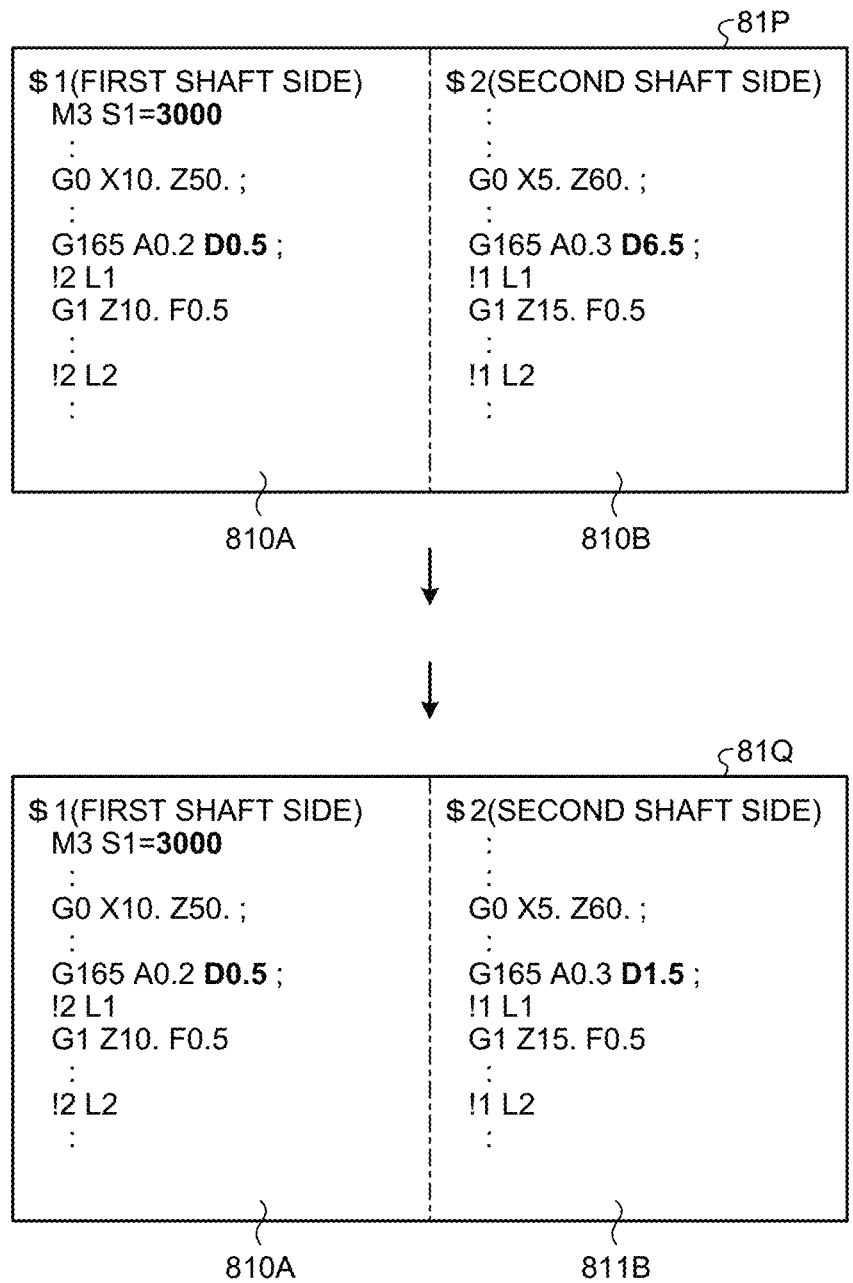
FIG. 3 is a diagram illustrating a first example of a machining program for use in the numerical control device according to the first embodiment.

FIG. 3 is a diagram illustrating a first example of a machining program for use in the numerical control device according to the first embodiment. The machining program 81P is used when the numerical control device 1X controls the machine tool 110. Therefore, the machining program 81P includes the machining program 810A for the first shaft 61A and the machining program 810B for the second shaft 61B.

The spindle rotation speed command M3 S1 in the machining program 81P is a command for the spindle rotation speed to the spindle 60. M3 S1=3000 is a command to rotate the spindle 60 in a rate of 3000 times per minute. G0 is a positioning command, G165 is a low-frequency vibration command, and G1 is a movement command. "A" defined in G165 is the amplitude of vibration, and "D" defined in the same is the number of vibrations during one rotation of the spindle 60.

In the machining program 81P, the tool 66A is positioned by G0 in the machining program 810A, and the tool 66B is positioned by G0 in the machining program 810B.

In a case where G165 is used in the machining program 810A for the first shaft 61A, the tool 66A vibrates in the Z1-axis direction at the amplitude and the number of vibrations specified by G165. The illustrated example represents a case where the tool 66A is vibrated at an amplitude of 0.2 mm with the number of vibrations being 0.5 times during one rotation of the spindle 60.

In a case where G165 is used in the machining program 810B for the second shaft 61B, the tool 66B vibrates at the amplitude and the number of vibrations specified by G165. The illustrated example represents a case where the tool 66B is vibrated at an amplitude of 0.3 mm with the number of vibrations being 6.5 times during one rotation of the spindle 60.

The number of vibrations in the machining program 810A is 0.5 times, and the number of vibrations in the machining program 810B is 6.5 times. As described above, the vibration frequency for the case of the number of vibrations of 6.5 times is larger than, for example, 100 Hz, that can follow the spindle rotation speed. Therefore, the determination unit 23 selects the number of vibrations of the second shaft 61B as an adjustment target. From among the specific number of vibrations that can follow the spindle rotation speed, the number-of-vibrations calculation unit 24 sets 1.5 times that is closest to the number of vibrations specified by the initial machining program 810B, as the number of vibrations of the second shaft 61B.

The numerical control device 1X executes a process similar to the process for the case where the machining program in which the number of vibrations of the second shaft 61B has been changed to 1.5 times is executed. A machining program 81Q is a machining program in which the number of vibrations of the second shaft 61B of the machining program 81P is changed to 1.5 times. The machining program 81Q includes the machining program 810A and a machining program 811B. The machining program 811B is a modified version of the machining program 810B with the number of vibrations of the second shaft 61B having been changed. Note that the numerical control device 1X may actually rewrite the machining program 81P to the machining program 81Q and execute the machining program 81Q.

Figure 4:
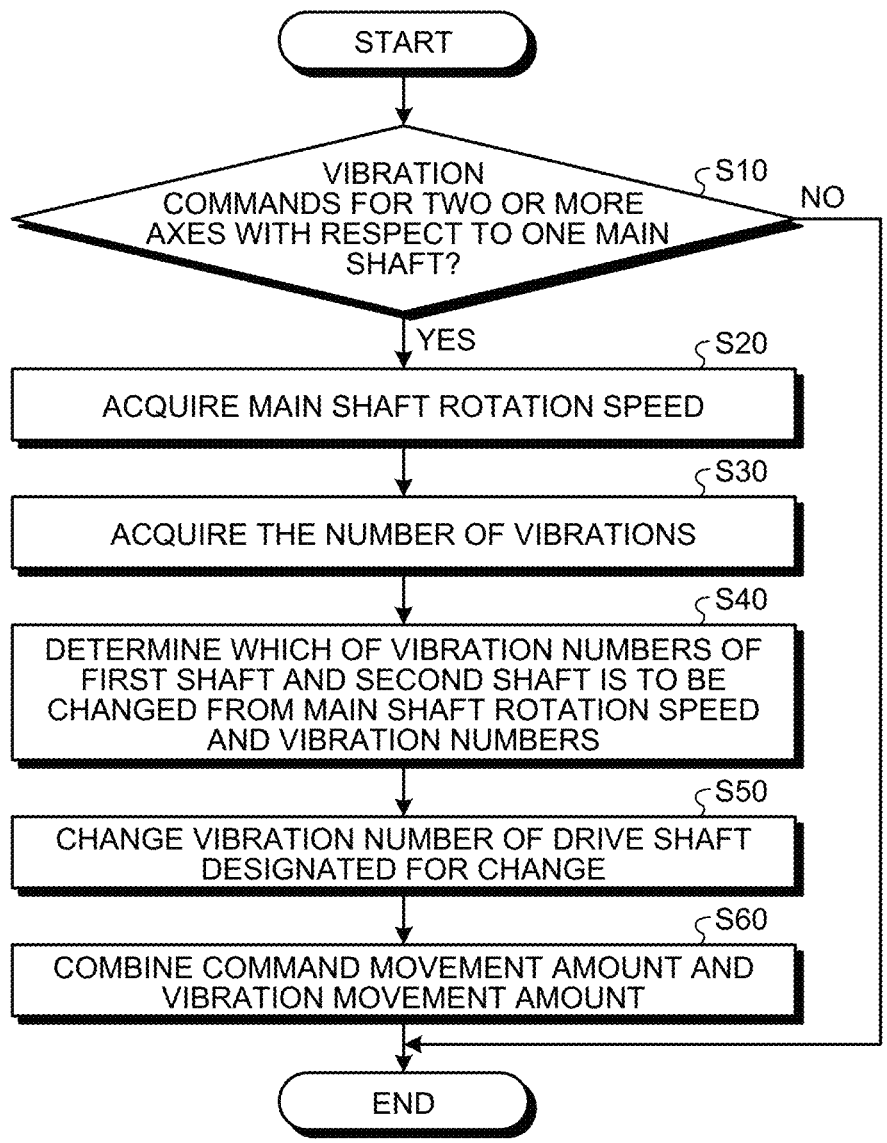
FIG. 4 is a flowchart illustrating a processing procedure for the numerical control device according to the first embodiment.

Next, a processing procedure for controlling the machine tool 110 will be described. FIG. 4 is a flowchart illustrating a processing procedure for the numerical control device according to the first embodiment. FIG. 4 represents a processing procedure for controlling the machine tool 110, performed by the numerical control device 1X.

The analysis processing unit 37 determines whether or not vibration commands in the machining program are commands for two or more axes with respect to one spindle (step S10). In other words, the analysis processing unit 37 determines whether or not vibration commands in the machining program are vibration commands for a machine tool including one spindle and two or more drive shafts.

When the vibration commands are not for two or more axes with respect to one spindle (step S10: No), the numerical control device 1X executes machining control according to the machining program without changing the number of vibrations.

When vibration commands are for two or more axes with respect to one spindle (step S10: Yes), the determination unit 23 retrieves a spindle rotation speed from the shared area 345 (step S20). The determination unit 23 also retrieves the number of vibrations that is a vibration condition, from the shared area 345 (step S30). Specifically, the determination unit 23 acquires the number of vibrations of the first shaft 61A and the number of vibrations of the second shaft 61B.

The determination unit 23 determines, based on the spindle rotation speed and the number of vibrations, which of the number of vibrations of the first shaft 61A and the number of vibrations of the second shaft 61B is to be changed (step S40). At this time, the determination unit 23 determines, based on the spindle rotation speed and the numbers of vibrations, whether or not the vibration frequencies follow the spindle rotation speed and whether or not the number of vibrations synchronize with the spindle rotation speed.

The determination unit 23 sends the determination result to the number-of-vibrations calculation unit 24. The number-of-vibrations calculation unit 24 changes the number of vibrations of the drive shaft for which the number of vibrations is to be changed, to a specific number of vibrations that can follow and synchronize with the spindle rotation speed (step S50).

The vibration movement amount calculation unit 22A calculates the vibration movement amount of the first shaft 61A based on the spindle rotation speed and the number of vibrations of the first shaft 61A, and the vibration movement amount calculation unit 22B calculates the vibration movement amount of the second shaft 61B based on the spindle rotation speed and the number of vibrations of the second shaft 61B.

The command movement amount calculation unit 21A calculates the command movement amount of the first shaft 61A based on the movement conditions from the analysis processing unit 37, and the command movement amount calculation unit 21B calculates the command movement amount of the second shaft 61B based on the movement conditions from the analysis processing unit 37.

The combining unit 27 combines the command movement amount and the vibration movement amount (step S60). Specifically, the combining unit 27 generates the combined movement amount of the first shaft 61A by combining the command movement amount of the first shaft 61A and the vibration movement amount of the first shaft 61A, and generates the combined movement amount of the second shaft 61B by combining the command movement amount of the second shaft 61B and the vibration movement amount of the second shaft 61B. After that, the control computation unit 2X controls the first shaft 61A using the combined movement amount of the first shaft 61A, and controls the second shaft 61B using the combined movement amount of the second shaft 61B.

Note that the numerical control device 1X may change both the number of vibrations of the first shaft 61A and the number of vibrations of the second shaft 61B. Below is a description of a machining program in which both the number of vibrations of the first shaft 61A and the number of vibrations of the second shaft 61B are changed.

FIG. 5 is a diagram illustrating a second example of a machining program for use in the numerical control device according to the first embodiment. The machining program 82P is used when the numerical control device 1X controls the machine tool 110. The machining program 82P includes a machining program 812A for the first shaft 61A and a machining program 812B for the second shaft 61B.

The machining program 812B is similar to the machining program 810B described with reference to FIG. 3. The machining program 812A differs from the machining program 810A described with reference to FIG. 3 in the number of vibrations in G165. The number of vibrations of G165 in the machining program 812A is 5.5 times.

Suppose that neither the vibration frequency of the first shaft 61A nor the vibration frequency of the second shaft 61B can follow the spindle rotation speed. In this case, the number-of-vibrations calculation unit 24 changes both the number of vibrations of the first shaft 61A and the number of vibrations of the second shaft 61B. The number-of-vibrations calculation unit 24 changes the number of vibrations of the second shaft 61B to 1.5 times using the method described with reference to FIG. 3. For the first shaft 61A, a specific number of vibrations that can follow the spindle rotation speed is 0.5 or 1.5 times. The initial number of vibrations of the first shaft 61A is smaller than the initial number of vibrations of the second shaft 61B. Therefore, the number-of-vibrations calculation unit 24 selects a smaller one than the number of vibrations set for the second shaft 61B from among a plurality of candidates for the number of vibrations. Note that the number-of-vibrations calculation unit 24 may select the one closest to the initial number of vibrations from among the plurality of candidates for the number of vibrations.

The numerical control device 1X executes a process similar to the process for the case where the machining program in which the number of vibrations of the first shaft 61A has been changed to 0.5 times is executed and the number of vibrations of the second shaft 61B has been changed to 1.5 times is executed. A machining program 82Q is a machining program in which the number of vibrations of the first shaft 61A of the machining program 82P is changed to 0.5 times and the number of vibrations of the second shaft 61B of the same is changed to 1.5 times. The machining program 82Q includes a machining program 813A and a machining program 813B. The machining program 813A is a modified version of the machining program 812A with the number of vibrations of the first shaft 61A having been changed, and the machining program 813B is a modified version of the machining program 812B with the number of vibrations of the second shaft 61B having been changed. Note that the numerical control device 1X may actually rewrite the machining program 82P to the machining program 82Q and execute the machining program 82Q.

In the description of the first embodiment, the machine tool 110 includes the two drive shafts for tools, but the number of drive shafts for tools may be three or more. In this case, the number of drive shafts for which the number of vibrations is to be change may be one or may be two or more.

As described above, according to the first embodiment, the number of vibrations of the first shaft 61A or the number of vibrations of the second shaft 61B is changed such that the number of vibrations of the first shaft 61A and the number of vibrations of the second shaft 61B can synchronize with and follow the spindle rotation speed, thereby making it possible to cause the machine tool 110 to execute vibration cutting with a plurality of drive shafts.

Second Embodiment

Next, the second embodiment of the present invention will be described with reference to FIGS. 6 to 8. In the second embodiment, for the machine tool 110 including one spindle and a plurality of drive shafts, the spindle rotation speed is changed so that the number of vibrations of each drive shaft can synchronize with the spindle rotation speed. That is, in the first embodiment, the rotation speed of the spindle is maintained and the number of vibrations of a drive shaft is changed, whereas in the second embodiment, the number of vibrations of the drive shaft is maintained and the rotation speed of the spindle is changed.

Figure 6:
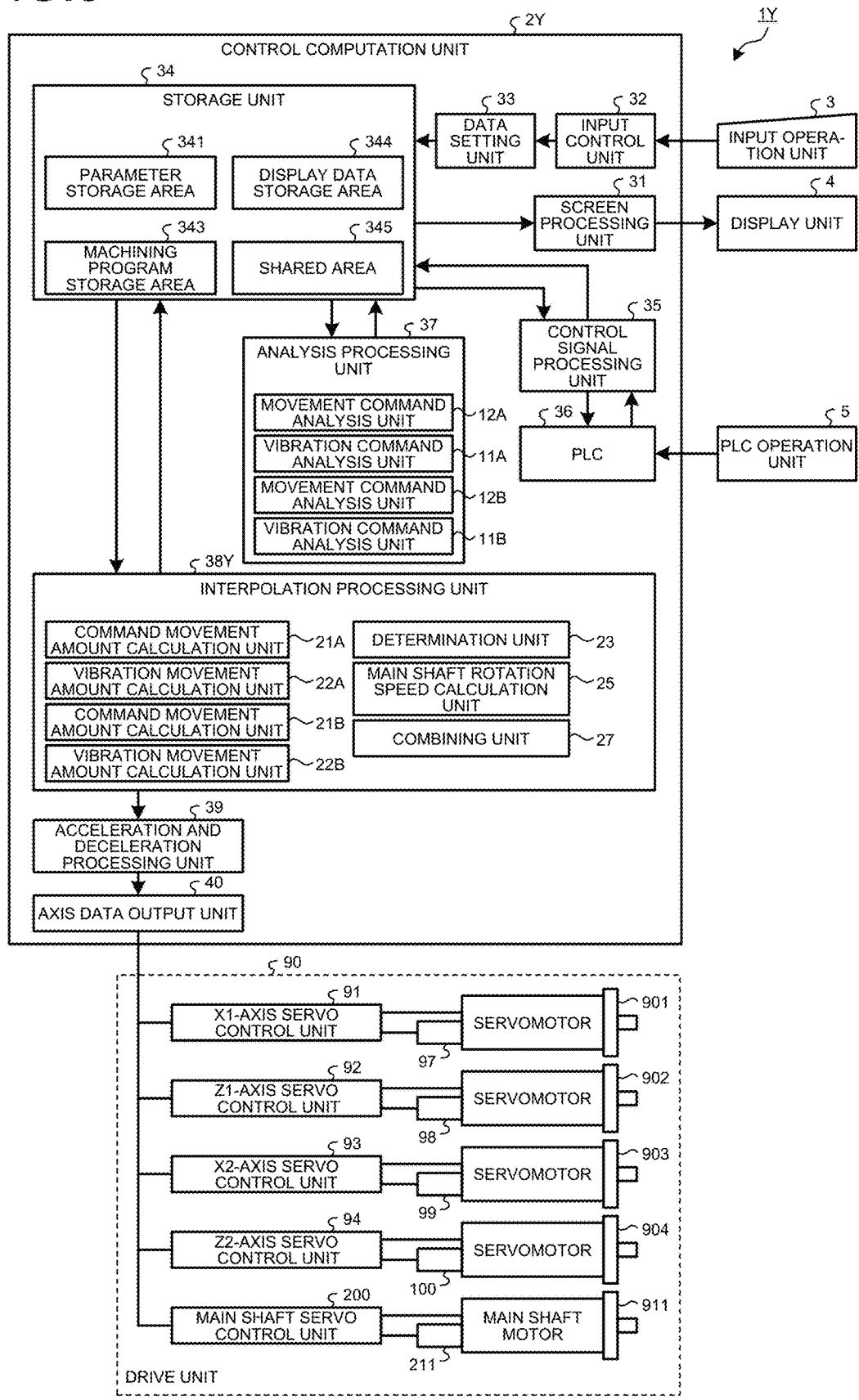
FIG. 6 is a diagram illustrating an exemplary configuration of a numerical control device according to a second embodiment.

FIG. 6 is a diagram illustrating an exemplary configuration of a numerical control device according to the second embodiment. Of constituent elements illustrated in FIG. 6, some that achieve the same functions as those of the numerical control device 1X of the first embodiment illustrated in FIG. 1 are denoted by the same reference signs, and their redundant descriptions are omitted.

The numerical control device 1Y is a computer having a configuration similar to that of the numerical control device 1X, and causes the machine tool 110 to carry out vibration cutting. Compared with the numerical control device 1X, the numerical control device 1Y includes a control computation unit 2Y instead of the control computation unit 2X. Compared with the control computation unit 2X, the control computation unit 2Y includes an interpolation processing unit 38Y instead of the interpolation processing unit 38X.

Compared with the interpolation processing unit 38X, the interpolation processing unit 38Y includes a spindle rotation speed calculation unit 25 instead of the number-of-vibrations calculation unit 24. The determination unit 23 according to the second embodiment determines whether or not the number of vibrations of the first shaft 61A synchronizes with the spindle rotation speed, based on the number of vibrations of the first shaft 61A and the spindle rotation speed. The determination unit 23 determines that the number of vibrations of the first shaft 61A synchronizes with the spindle rotation speed when the frequency corresponding to the number of vibrations of the first shaft 61A is within a specific range. The determination unit 23 determines whether or not the number of vibrations of the second shaft 61B synchronizes with the spindle rotation speed, based on the number of vibrations of the second shaft 61B and the spindle rotation speed. The determination unit 23 determines that the number of vibrations of the second shaft 61B synchronizes with the spindle rotation speed when the frequency corresponding to the number of vibrations of the second shaft 61B is within a specific range.

In a case where any one of the number of vibrations of the first shaft 61A and the number of vibrations of the second shaft 61B does not synchronize with the spindle rotation speed or cannot follow the spindle rotation speed, the spindle rotation speed calculation unit 25 changes the spindle rotation speed so that the number of vibrations of the first shaft 61A and the number of vibrations of the second shaft 61B can synchronize with and follow the spindle rotation speed. The spindle rotation speed calculation unit 25 changes the spindle rotation speed on the basis of the numbers of vibrations of the first shaft 61A and the second shaft 61B.

In a case where two or more candidates for the spindle rotation speed are available, the spindle rotation speed calculation unit 25 adopts one thereof closest to the initial spindle rotation speed. After the spindle rotation speed is changed, the spindle rotation speed calculation unit 25 sends the changed spindle rotation speed to the vibration movement amount calculation units 22A and 22B, and the acceleration and deceleration processing unit 39. When the spindle rotation speed is not changed, in which case the spindle rotation speed calculation unit 25 sends the spindle rotation speed as it is to the vibration movement amount calculation units 22A and 22B, and the acceleration and deceleration processing unit 39.

The vibration movement amount calculation unit 22A calculates the vibration movement amount of the first shaft 61A based on the spindle rotation speed and the number of vibrations of the first shaft 61A sent from the spindle rotation speed calculation unit 25. The vibration movement amount calculation unit 22B calculates the vibration movement amount of the second shaft 61B based on the spindle rotation speed and the number of vibrations of the second shaft 61B sent from the spindle rotation speed calculation unit 25. Other processes performed by the interpolation processing unit 38Y are similar to those in the interpolation processing unit 38X.

Figure 7:
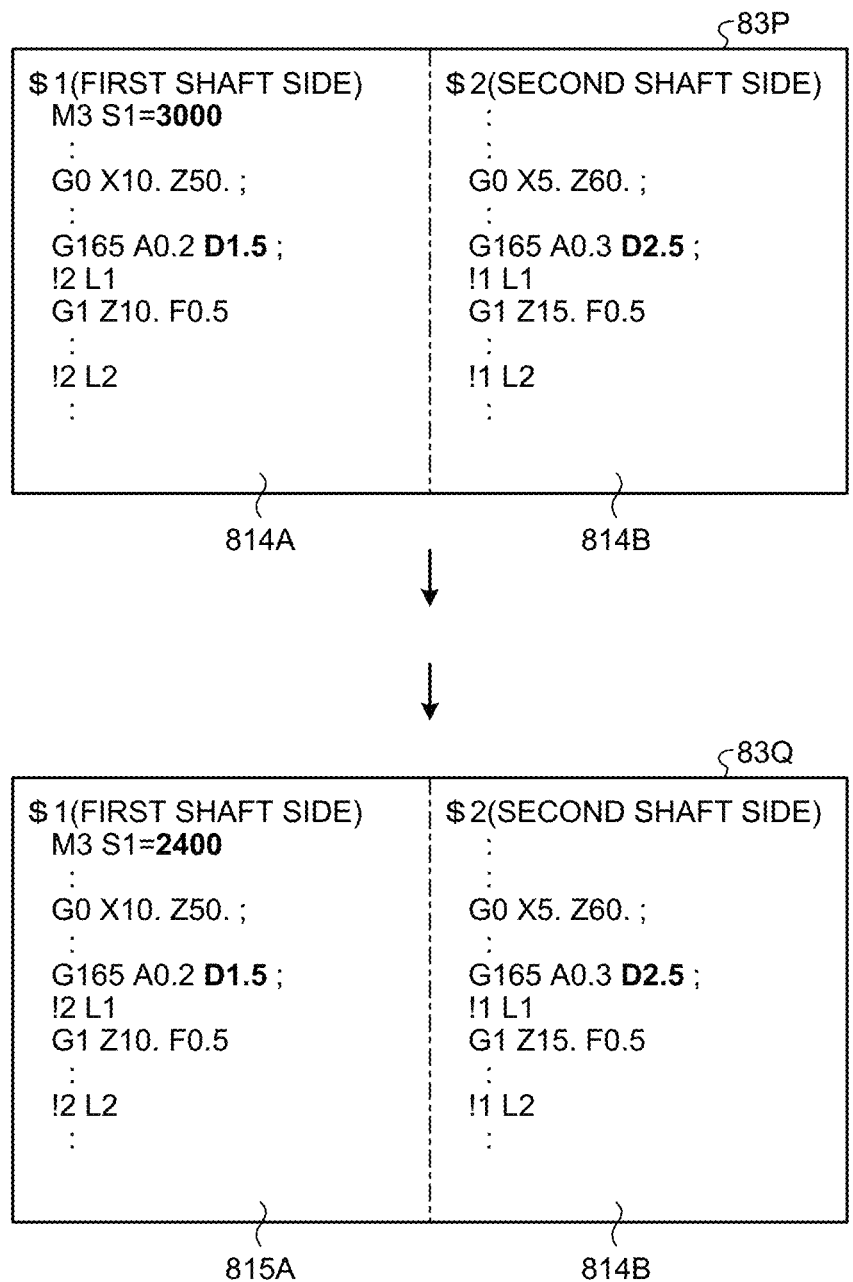
FIG. 7 is a diagram illustrating an example of a machining program for use in the numerical control device according to the second embodiment.

FIG. 7 is a diagram illustrating an example of a machining program for use in the numerical control device according to the second embodiment. The machining program 83P is used when the numerical control device 1Y controls the machine tool 110. The machining program 83P includes a machining program 814A for the first shaft 61A and a machining program 814B for the second shaft 61B.

The machining program 814A is similar to the machining program 810A described with reference to FIG. 3. The machining program 814B differs from the machining program 810B described with reference to FIG. 3 in the number of vibrations in G165. The number of vibrations of G165 in the machining program 814B is 2.5 times.

The determination unit 23 determines whether or not the number of vibrations of the first shaft 61A synchronizes with and can follow the spindle rotation speed, based on 1.5 times that is the number of vibrations of the first shaft 61A and 3000 rotations that is the spindle rotation speed. In this situation, the number of vibrations of the first shaft 61A synchronizes with and can follow the spindle rotation speed.

The determination unit 23 also determines whether or not the number of vibrations of the second shaft 61B synchronizes with and can follow the spindle rotation speed, based on 2.5 times that is the number of vibrations of the second shaft 61B and 3000 rotations that is the spindle rotation speed. In this situation, the number of vibrations of the second shaft 61B synchronizes with the spindle rotation speed, but cannot follow the spindle rotation speed. That is, the vibration cutting in which the spindle rotates 3000 times per minute and the number of vibrations is 2.5 times per rotation of the spindle leads to a failure in satisfactorily separating chips because the machining device cannot follow the vibration machining due to a mechanical structural factor in the machine tool 110 (for example, property such as inertia). In other words, if the vibration frequency of the tool 66B is too high, the vibration waveform of the tool 66B is blunted due to a structural factor of the machine tool 110, that is, the ideal vibration waveform accurately according to the vibration command cannot be realized. Therefore, the vibration waveform of the tool 66B at the M-th (M is a natural number) rotation does not overlap the vibration waveform at the (M+1)-th rotation. Thus, an excessive increase in the spindle rotation speed leads to a failure in separating chips from the workpiece 70 because the number of vibrations of the second shaft 61B cannot follow the spindle rotation speed. In view of this, a method for setting a spindle rotation speed that can be followed by the number of vibrations will be described below.

As mentioned above, suppose that the number of vibrations of the second shaft 61B of 2.5 times cannot follow the spindle rotation speed (S1) of 3000 rotations. In this case, the spindle rotation speed is changed so that the number of vibrations of the first shaft 61A and the number of vibrations of the second shaft 61B can follow the spindle rotation speed. That is, the spindle rotation speed calculation unit 25 changes the spindle rotation speed in order to make the number of vibrations of the second shaft 61B follow the spindle rotation speed while maintaining the same degree of chip separation effect. First, the spindle rotation speed calculation unit 25 calculates a first vibration frequency f1 corresponding to the number of vibrations of the first shaft 61A. Next, the first vibration frequency f1 is temporarily applied as a second vibration frequency f2 for the second shaft 61B. Further, the spindle rotation speed calculation unit 25 temporarily calculates an ideal spindle rotation speed S2 for the second shaft 61B based on the number of vibrations of the second shaft 61B of 2.5 times and the second vibration frequency f2 temporarily applied to the second shaft 61B.

What are temporarily calculated at this point are the spindle rotation speed S1, the number of vibrations of 1.5 times, and the first vibration frequency f1 for the first shaft 61A, and the spindle rotation speed S2, the number of vibrations of 2.5 times, and the second vibration frequency f2 (=f1) for the second shaft 61B. Here, because the spindle 60 is only a single spindle for the first shaft 61A and the second shaft 61B, it is necessary to adjust the spindle rotation speed using their values. In this situation, the spindle rotation speed is adjusted through selection from a range between S1 and S2.

For example, the spindle rotation speed calculation unit 25 calculates the average value (intermediate value) of the spindle rotation speed for the first shaft 61A and the calculated spindle rotation speed for the second shaft 61B, and temporarily sets the average value (intermediate value) as a common spindle rotation speed Sc for the first shaft 61A and the second shaft 61B. A first vibration frequency f1c is recalculated from the spindle rotation speed Sc and the number of vibrations of the first shaft 61A of 1.5 times, and it is confirmed whether the first vibration frequency f1c can follow the spindle rotation speed Sc. In addition, a second vibration frequency f2c is recalculated from the spindle rotation speed Sc and the number of vibrations of the second shaft 62B of 2.5 times, and it is confirmed whether the second vibration frequency f2c can follow the spindle rotation speed Sc.

If the first vibration frequency f1c and the second vibration frequency f2c follow and synchronize with the spindle rotation speed Sc, the temporarily set spindle rotation speed Sc is adopted as a new spindle rotation speed having been changed.

In the example of FIG. 7, suppose that the ideal spindle rotation speed S2 calculated from the number of vibrations of the second shaft 61B of 2.5 times is 1800 rotations. In this case, the spindle rotation speed calculation unit 25 first temporarily sets, as the common spindle rotation speed Sc, 2400 rotations that is the average value (intermediate value) of 3000 rotations that is the initial spindle rotation speed S1 and 1800 rotations that is S2. Because the first shaft 61A and the second shaft 61B can follow and synchronize with the spindle rotation speed Sc of 2400 rotations, the spindle rotation speed Sc is determined to be 2400 rotations. Then, the spindle rotation speed calculation unit 25 changes the spindle rotation speed from 3000 rotations to 2400 rotations.

Note that if the second shaft 61B can follow the initial spindle rotation speed for the first shaft 61A of 3000 rotations, the spindle rotation speed calculation unit 25 may set the initial spindle rotation speed as the common spindle rotation speed.

If at least one of the first shaft 61A and the second shaft 61B cannot follow or synchronize with the spindle rotation speed Sc temporarily set from between the spindle rotation speeds S1 and S2, the spindle rotation speed Sc is temporarily reset again from between the spindle rotation speeds S1 and S2, and similar steps are repeated. For example, if the second shaft 61B does not follow the spindle rotation speed Sc, the spindle rotation speed can be set again from between the spindle rotation speeds Sc and S2. If the first shaft 61A does not follow the spindle rotation speed Sc, the spindle rotation speed can be set again from between Sc and S1.

Assuming that the spindle rotation speed Sc is determined to be 2400 rotations, for example, the numerical control device 1Y executes a process similar to the process for the case where the machining program in which the spindle rotation speed has been changed to 2400 rotations is executed. A machining program 83Q is a machining program in which the spindle rotation speed of the machining program 82P is changed to 2400 rotations. The machining program 83Q includes a machining program 815A and the machining program 814B. The machining program 815A is a modified version of the machining program 814A with the spindle rotation speed having been changed. Note that the numerical control device 1Y may actually rewrite the machining program 83P to the machining program 83Q and execute the machining program 83Q.

Next, a processing procedure for the numerical control device 1Y to control the machine tool 110 will be described. FIG. 8 is a flowchart illustrating a processing procedure for the numerical control device according to the second embodiment. FIG. 8 represents a processing procedure for controlling the machine tool 110 performed by the numerical control device 1Y. Note that some processes in FIG. 8 similar to the processes already described with reference to FIG. 4 are not described here.

Figure 8:
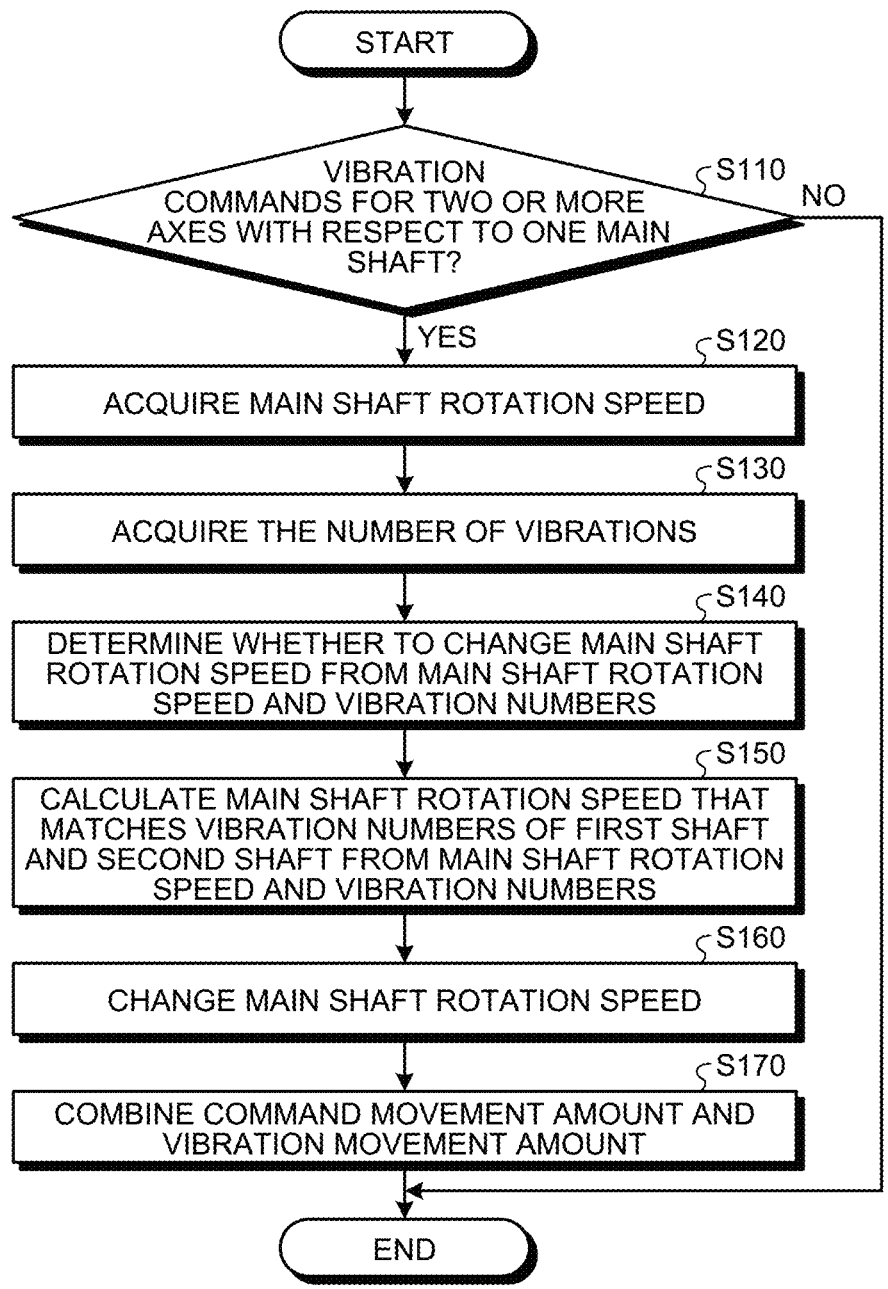
FIG. 8 is a flowchart illustrating a processing procedure for the numerical control device according to the second embodiment.

Processes of steps S110 to S130 in FIG. 8 are equivalent to those of steps S10 to S30 in FIG. 4.

The determination unit 23 determines whether to change the spindle rotation speed based on the spindle rotation speed and the number of vibrations (step S140). The said vibration condition is the number of vibrations. Therefore, in this case, the determination unit 23 determines whether or not the vibration frequency corresponding to the number of vibrations of the first shaft 61A can follow the spindle rotation speed, and whether the vibration frequency corresponding to the number of vibrations of the second shaft 61B can follow the spindle rotation speed. When the frequency of the first shaft 61A or the frequency of the second shaft 61B cannot follow the spindle rotation speed, for example, if a failure in satisfactorily separating chips from the workpiece 70 is caused, the determination unit 23 determines to change the spindle rotation speed.

Further, the determination unit 23 determines whether or not the numbers of vibrations of the first shaft 61A and the second shaft 61B synchronize with the spindle rotation speed. When the number of vibrations of the first shaft 61A or the number of vibrations of the second shaft 61B does not synchronize with the spindle rotation speed, the determination unit 23 determines to change the spindle rotation speed. In this example, synchronization means that the tool vibrates (0.5+N) times during one rotation of the spindle. Complete synchronization is preferable but not essential, and the tool only needs to vibrate about (0.5+N) times during one rotation of the spindle.

In contrast, when the first shaft 61A and the second shaft 61B synchronize with and can follow the spindle rotation speed, the determination unit 23 determines not to change the spindle rotation speed. The determination unit 23 may determine to change the spindle rotation speed only when the first shaft 61A and the second shaft 61B cannot follow the spindle rotation speed.

The determination unit 23 sends the determination result to the number-of-vibrations calculation unit 24. The following description is based on the assumption that the determination unit 23 has determined to change the spindle rotation speed. The spindle rotation speed calculation unit 25 calculates, based on the spindle rotation speed and the number of vibrations, a spindle rotation speed that matches the numbers of vibrations of the first shaft 61A and the second shaft 61B (step S150). Specifically, the spindle rotation speed calculation unit 25 sets a frequency that can follow the spindle rotation speed to the drive shaft assessed as incapable of following the spindle rotation speed, and thereupon calculates a spindle rotation speed that is synchronized with and can be followed by the numbers of vibrations of the first shaft 61A and the second shaft 61B. Then, the spindle rotation speed calculation unit 25 changes the initial spindle rotation speed to the calculated spindle rotation speed (step S160). When it is determined that the spindle rotation speed is not to be changed, the numerical control device 1Y executes normal operation according to the machining program without changing the spindle rotation speed.

The vibration movement amount calculation unit 22B calculates the vibration movement amount of the first shaft 61A based on the spindle rotation speed and the number of vibrations of the first shaft 61A, and calculates the vibration movement amount of the second shaft 61B based on the spindle rotation speed and the number of vibrations of the second shaft 61B. The combining unit 27 generates a combined movement amount by combining the command movement amount and the vibration movement amount (step S170).

Note that the numerical control device 1Y may execute both change of the spindle rotation speed and change of the first shaft 61A or the second shaft 61B. In other words, the numerical control device 1Y changes at least one of the spindle rotation speed, the first shaft 61A, and the second shaft 61B.

As described above, according to the second embodiment, the spindle rotation speed is changed so that the number of vibrations of the first shaft 61A and the number of vibrations of the second shaft 61B can synchronize with and follow the spindle rotation speed, thereby making it possible to cause the machine tool 110 to execute vibration cutting with a plurality of drive shafts.

Third Embodiment

Next, the third embodiment of the present invention will be described with reference to FIGS. 9 to 14. In the third embodiment, if one drive shaft starts vibration cutting first when the spindle rotation speed is changed, the other drive shaft does not start vibration cutting, and both drive shafts execute vibration cutting at a changed spindle rotation speed at the timing when any vibration cutting is not performed by the both drive shafts.

Figure 9:
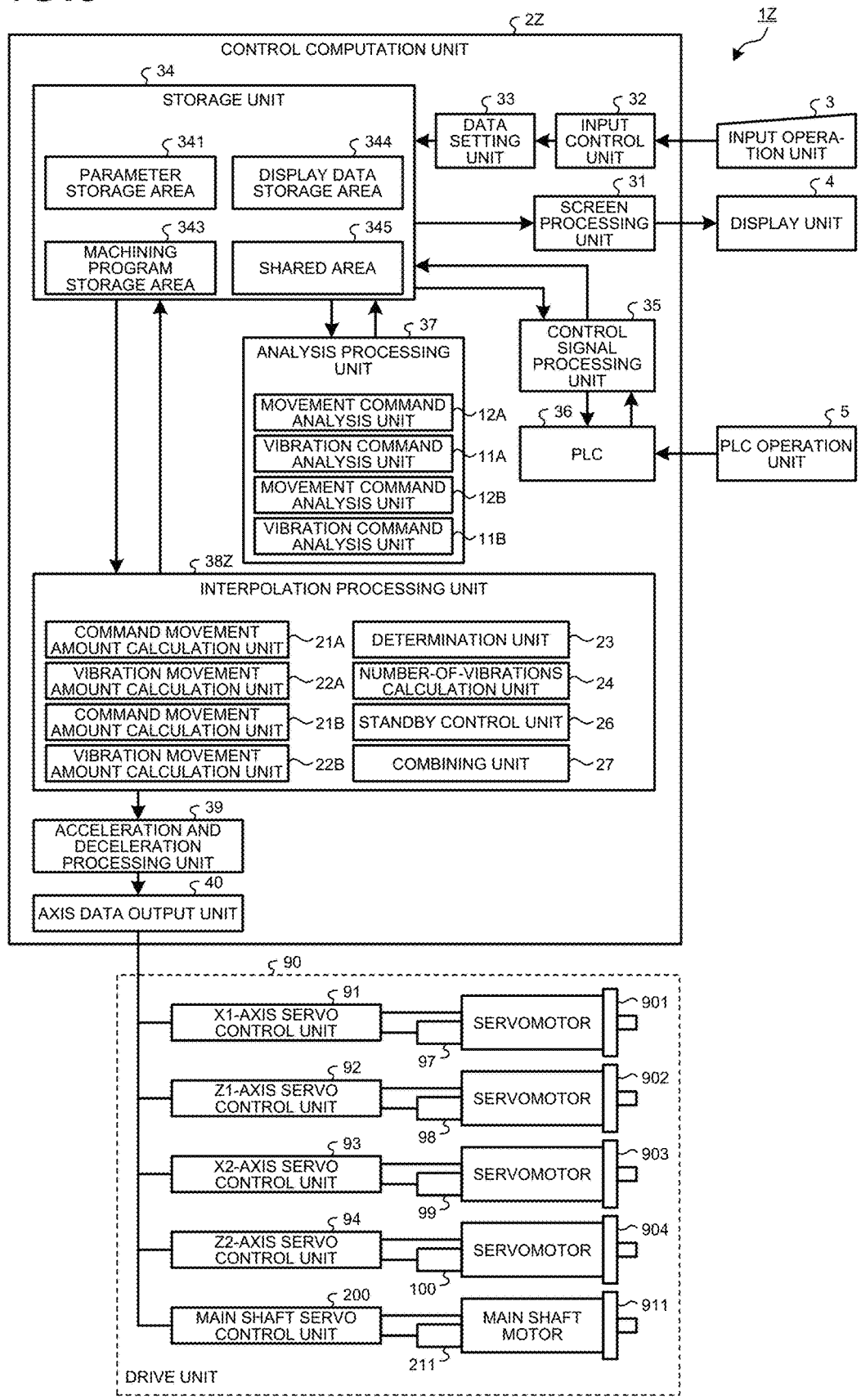
FIG. 9 is a diagram illustrating an exemplary configuration of a numerical control device according to a third embodiment.

FIG. 9 is a diagram illustrating an exemplary configuration of a numerical control device according to the third embodiment. Of constituent elements illustrated in FIG. 9, some that achieve the same functions as those of the numerical control device 1X of the first embodiment illustrated in FIG. 1 are denoted by the same reference signs, and their redundant descriptions are omitted.

The numerical control device 1Z is a computer having a configuration similar to that of the numerical control device 1X, and causes the machine tool 110 to execute vibration cutting. Compared with the numerical control device 1X, the numerical control device 1Z includes a control computation unit 2Z instead of the control computation unit 2X. Compared with the control computation unit 2X, the control computation unit 2Z includes an interpolation processing unit 38Z instead of the interpolation processing unit 38X.

Compared with the interpolation processing unit 38X, the interpolation processing unit 38Z further includes a standby control unit 26. The standby control unit 26 determines whether or not it is the timing when the spindle rotation speed can be changed. The numerical control device 1Z allows one drive shaft to perform vibration cutting but does not allow both drive shafts to perform vibration cutting until the spindle rotation speed is changed. Unless it is the timing when the spindle rotation speed can be changed, the standby control unit 26 delays the process of changing the spindle rotation speed until the timing when the spindle rotation speed can be changed.

The timing when the spindle rotation speed can be changed is a timing when any vibration cutting is not performed by both of the first shaft 61A and the second shaft 61B. If one drive shaft of the first shaft 61A and the second shaft 61B starts vibration cutting for the workpiece 70 before the spindle rotation speed is changed, the standby control unit 26 does not allow the other drive shaft that is not executing vibration cutting, to start vibration cutting. The standby control unit 26 causes the spindle rotation speed to be changed at the timing when vibration cutting is not executed by the one drive shaft. That is, at the timing when any vibration cutting is not performed by both of the first shaft 61A and the second shaft 61B, the standby control unit 26 causes the spindle rotation speed to be changed while prohibiting both shafts from performing vibration cutting. A period in which vibration cutting is not performed corresponds to a period during the execution of the positioning command G0, a period during a wait time of the operation of the first shaft 61A and the operation of the second shaft 61B, or the like. After the spindle rotation speed is changed, the numerical control device 1Z causes both the first shaft 61A and the second shaft 61B to execute vibration cutting.

FIG. 10 is a diagram illustrating a first example of a machining program for use in the numerical control device according to the third embodiment. The machining program 84 is used when the numerical control device 1Z controls the machine tool 110. The machining program 84 includes a machining program 816A for the first shaft 61A and a machining program 816B for the second shaft 61B.

Before the spindle rotation speed is changed, the execution of the machining program 816A may proceed, and the processing of the machining program 816B may be delayed from the processing of the machining program 816A. That is, the numerical control device 1Z may start the vibration commands of the a1 and a2 blocks of the machining program 816A first, and proceed to execute the vibration command of the b1 block of the machining program 816B during the vibration cutting of the first shaft 61A. In this case, the standby control unit 26 does not allow the vibration command of the b1 block of the machining program 816B to start, skips the vibration command, and executes the b2 and b3 blocks. Then, only after reaching the waiting state of the b3 block and the a3 block, the standby control unit 26 enables the vibration cutting condition (mode) for the b1 block.

After that, at the timing when vibration cutting is not performed in the first shaft 61A, the numerical control device 1Z changes the spindle rotation speed and then executes the vibration cutting using the first shaft 61A and the second shaft 61B.

Figure 11:
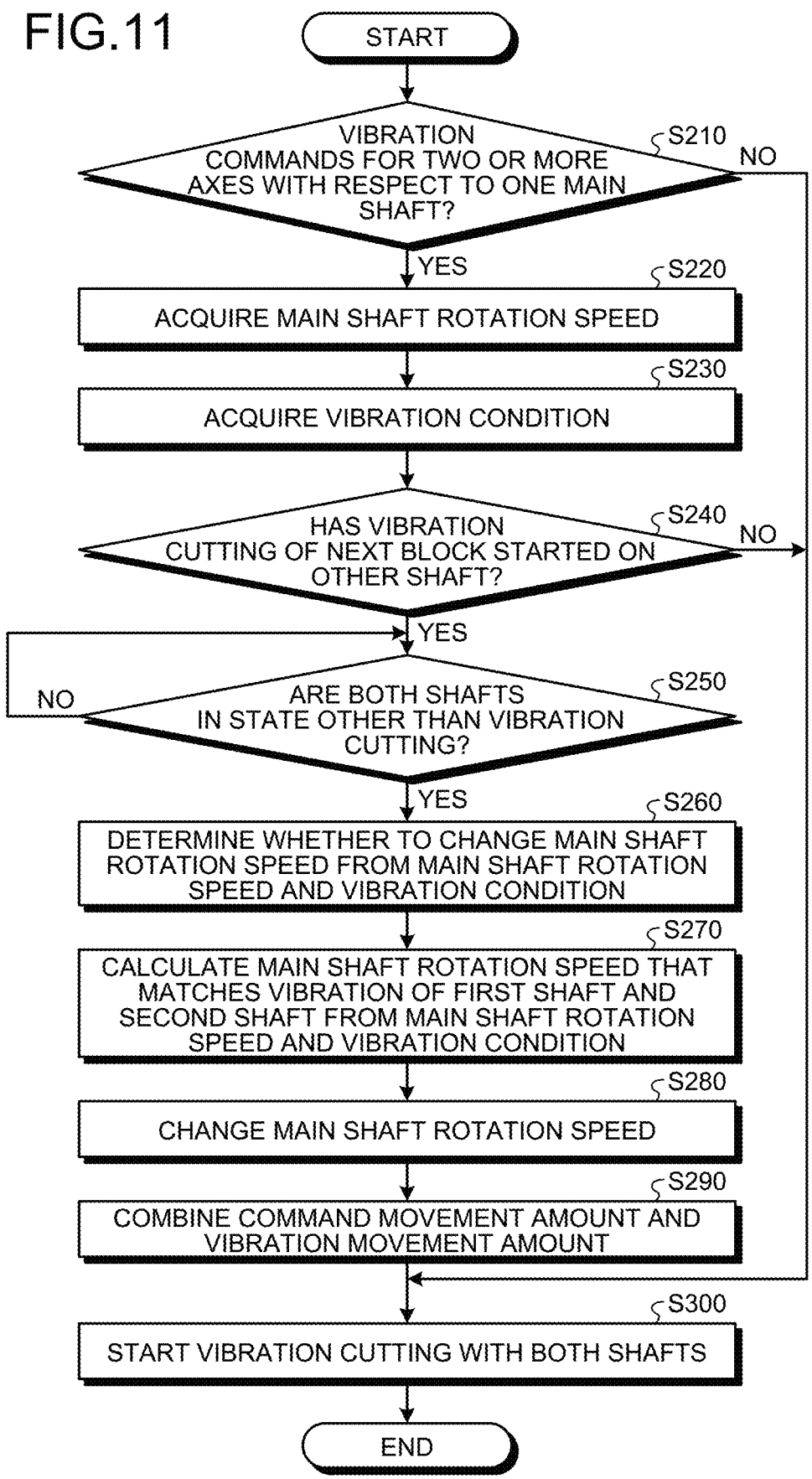
FIG. 11 is a flowchart illustrating a processing procedure for the numerical control device according to the third embodiment.

Next, a processing procedure for the numerical control device 1Z to control the machine tool 110 will be described. FIG. 11 is a flowchart illustrating a processing procedure for the numerical control device according to the third embodiment. FIG. 11 represents a processing procedure for controlling the machine tool 110 by the numerical control device 1Z. Note that some processes in FIG. 11 similar to the processes described with reference to FIG. 4 are not described here. The following description is based on the assumption that the vibration cutting of the first shaft 61A is started first and the vibration cutting of the second shaft 61B is started later.

Processes of steps S210 to S230 in FIG. 11 are similar to those of steps S10 to S30 in FIG. 4. The numerical control device 1Z executes the vibration cutting of the drive shaft of the first shaft 61A at the initial spindle rotation speed until the spindle rotation speed is changed.

After the vibration cutting of the first shaft 61A is started, when it is the timing when the vibration cutting of the second shaft 61B is started, the standby control unit 26 determines whether or not it is the timing when the spindle rotation speed can be changed. That is, in response to vibration commands for the first shaft 61A and the second shaft 61B, the standby control unit 26 determines whether or not the vibration cutting of the next block has started on the first shaft 61A that is the axis other than the second shaft 61B (step S240). For example, if the vibration command for the a1 block of the machining program 816A is being executed, the vibration cutting for the next block has started on the first shaft 61A.

When the vibration cutting has started on the first shaft 61A (step S240: Yes), the standby control unit 26 does not allow to start vibration cutting on the second shaft 61B. Then, the standby control unit 26 monitors the operations of both the first shaft 61A and the second shaft 61B, and determines whether or not both the first shaft 61A and the second shaft 61B are in a state other than the vibration cutting state (step S250).

When any one of the first shaft 61A and the second shaft 61B is in the process of vibration cutting (step S250: No), the standby control unit 26 monitors the operations of both the first shaft 61A and the second shaft 61B, and determines whether or not both the first shaft 61A and the second shaft 61B are in a state other than the vibration cutting state (step S250).

When both the first shaft 61A and the second shaft 61B are in a state other than the vibration cutting state (step S250: Yes), the standby control unit 26 notifies the spindle rotation speed calculation unit 25 that neither shaft is in the process of vibration cutting. Based on processes similar to the processes described with reference to FIG. 8, the numerical control device 1Z performs determination of whether or not to change the spindle rotation speed, calculation of a spindle rotation speed, changeover of the spindle rotation speed, and generation of a combined movement amount (steps S260 to S290). Processes of steps S260 to S290 are similar to those of steps S140 to S170 in FIG. 8. After that, the numerical control device 1Z starts vibration cutting with both shafts, that is, the first shaft 61A and the second shaft 61B (step S300).

If one of the tool 66A and 66B starts vibration cutting at the timing when the other thereof is currently performing vibration cutting, a machining defect may occur in the portion machined by the vibration cutting. In addition, if the spindle rotation speed is changed at the timing when one of the tool 66A and 66B is currently performing vibration cutting, a machining defect may occur in the portion machined by the vibration cutting. In the third embodiment, the spindle rotation speed is changed at the timing when both of the tool 66A and 66B are not performing vibration cutting, thereby making it possible to prevent the occurrence of machining defects.

Note that the numerical control device 1Z may change the number of vibrations of the first shaft 61A or the second shaft 61B instead of the spindle rotation speed. In this case, the numerical control device 1Z changes the number of vibrations of the first shaft 61A or the second shaft 61B when neither the first shaft 61A nor the second shaft 61B is in the process of vibration cutting. The numerical control device 1Z changes the number of vibrations of the first shaft 61A or the second shaft 61B based on processes similar to the processes described with reference to FIG. 4.

In this way, if one of the tool 66A and 66B starts vibration cutting before at least one of the number of vibrations of the first shaft 61A, the number of vibrations of the second shaft 61B, and the spindle rotation speed is changed, the numerical control device 1Z does not start the vibration cutting for the other tool. Then, at the timing when neither the tool 66A nor 66B is performing vibration cutting, the numerical control device 1Z changes at least one of the number of vibrations of the first shaft 61A, the number of vibrations of the second shaft 61B, and the spindle rotation speed.

Vibration cutting may be applied not only to the Z-axis direction but also to interpolation machining based on two or more axes such as the X-axis direction and the Z-axis direction. That is, the numerical control device 1Z may cause vibration cutting to be performed in a combined direction of the first shaft 61A and the second shaft 61B. In this case, vibration cutting is performed in an axial direction different from the central axis of the spindle 60.

Figures 12, 13:
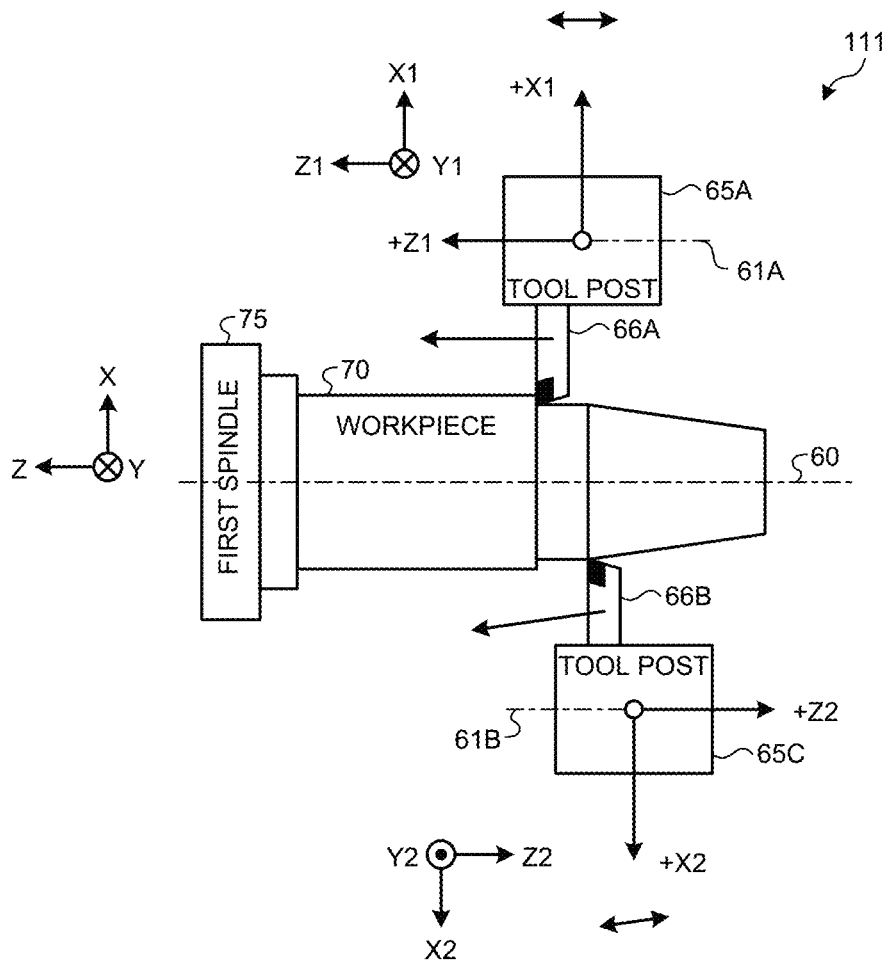
FIG. 12 is a diagram illustrating another exemplary configuration of a machine tool according to the third embodiment.
FIG. 13 is a diagram illustrating a second example of a machining program for use in the numerical control device according to the third embodiment.

FIG. 12 is a diagram illustrating another exemplary configuration of a machine tool according to the third embodiment. Of constituent elements illustrated in FIG. 12, some that achieve the same functions as those of the machine tool 110 of the first embodiment illustrated in FIG. 2 are denoted by the same reference signs, and their redundant descriptions are omitted.

Compared with the machine tool 110, the machine tool 111 includes a tool post 65C instead of the tool post 65B. Similarly to the tool post 65B, the tool post 65C is configured to which the tool 66B can be attached. Similarly to the tool post 65B, the tool post 65C is movable in the X2-axis direction and the Z2-axis direction. In the machine tool 111, the Z2 axis corresponds to the second shaft 61B in a similar manner to the machine tool 110.

The tool post 65C is vibrated in the X2 direction and the Z2-axis direction to thereby perform vibration cutting machining on the workpiece 70 with the tool 66B. Because the tool post 65C can vibrate in the X2 direction and the Z2-axis direction, the tool 66B can machine the workpiece 70 into a tapered shape. In this way, the numerical control device 1Z can cause even the machine tool 111 capable of tapered shape machining to execute vibration cutting.

FIG. 13 is a diagram illustrating a second example of a machining program for use in the numerical control device according to the third embodiment. The machining program 85 is used when the numerical control device 1Z controls the machine tool 111. The machining program 85 includes a machining program 817A for the first shaft 61A and a machining program 817B for the second shaft 61B. The machining program 817B is a machining program for vibrating the tool post 65C in the X-axis direction and the Z-axis direction, unlike the machining program 810B or the like for vibrating the tool post 65B in the Z-axis direction. Therefore, the machining program 817B includes an X-directional command and a Z-directional command in G1 that is a movement command. Note that the machine tool 111 may be controlled by the numerical control device 1X or the numerical control device 1Y.

Similarly to the tool post 65C, the tool post 65A may be moved and vibrated in a combined direction of two axial directions. In this case, the tool post 65A moves and vibrates in a combined direction of the X1-axis direction and the Z1-axis direction, that is, an interpolation direction in which the X1-axis direction and the Z1-axis direction are used.

Figure 14:
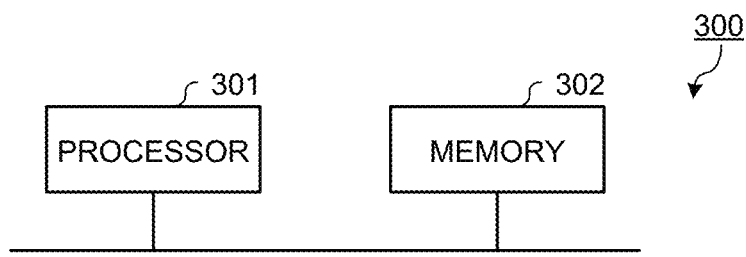
FIG. 14 is a diagram illustrating an exemplary hardware configuration of a control computation unit according to any of the first to third embodiments.

Here, a hardware configuration of the control computation units 2X to 2Z included in the numerical control devices 1X to 1Z will be described. FIG. 14 is a diagram illustrating an exemplary hardware configuration of the control computation unit according to each of the first to third embodiments. Because the control computation units 2X to 2Z have similar hardware configurations, the hardware configuration of the control computation unit 2Z will be described here.

The control computation unit 2Z can be implemented by a control circuit 300 illustrated in FIG. 14, that is, a processor 301 and a memory 302. The processor 301 is exemplified by a CPU (or also referred to as a central processing unit, a central processing device, a processing device, a computation device, a microprocessor, a microcomputer, a processor, or a DSP (digital signal processor), or a system LSI (large scale integration). The memory 302 is exemplified by a random access memory (RAM) or a read only memory (ROM).

The control computation unit 2Z is implemented by the processor 301 reading and executing a program stored in the memory 302 for executing the operation of the control computation unit 2Z. It can also be said that this program causes the computer to execute procedure or a method for the control computation unit 2Z. The memory 302 is also used as a temporary memory when the processor 301 performs various kinds of processing.

The program executed by the processor 301 may be a computer program product having a computer-readable non-transitory storage medium including a number of computer-executable instructions for performing data processing. The program executed by the processor 301 causes the computer to execute an operation in which the data processing is performed by the plurality of instructions.

Alternatively, the control computation unit 2Z may be implemented by dedicated hardware. Note that some of the functions of the control computation unit 2Z may be implemented by dedicated hardware, and the other functions may be implemented by software or firmware.

In this way, according to the third embodiment, if one of the tool 66A of the first shaft 61A and the tool 66B of the second shaft 61B starts vibration cutting first before at least one of the number of vibrations of the first shaft 61A, the number of vibrations of the second shaft 61B, and the spindle rotation speed is changed, the numerical control device 1Z does not start the vibration cutting of the other tool. At the timing when neither the tool 66A nor the second shaft 61B is performing vibration cutting, the numerical control device 1Z changes at least one of the number of vibrations of the first shaft 61A, the number of vibrations of the second shaft 61B, and the spindle rotation speed, and causes the first shaft 61A and the second shaft 61B to perform vibration cutting. Therefore, even when one of the first shaft 61A and the second shaft 61B starts vibration cutting first, it is possible to cause the machine tool 110 to execute vibration cutting based on a plurality of drive shafts.

Fourth Embodiment

Next, a fourth embodiment of the present invention will be described with reference to FIGS. 15 and 16. In the fourth embodiment, a machine learning device learns whether or not a combination of the number of vibrations, a vibration amplitude, and a spindle rotation speed is an appropriate combination for vibration cutting.

Figure 15:
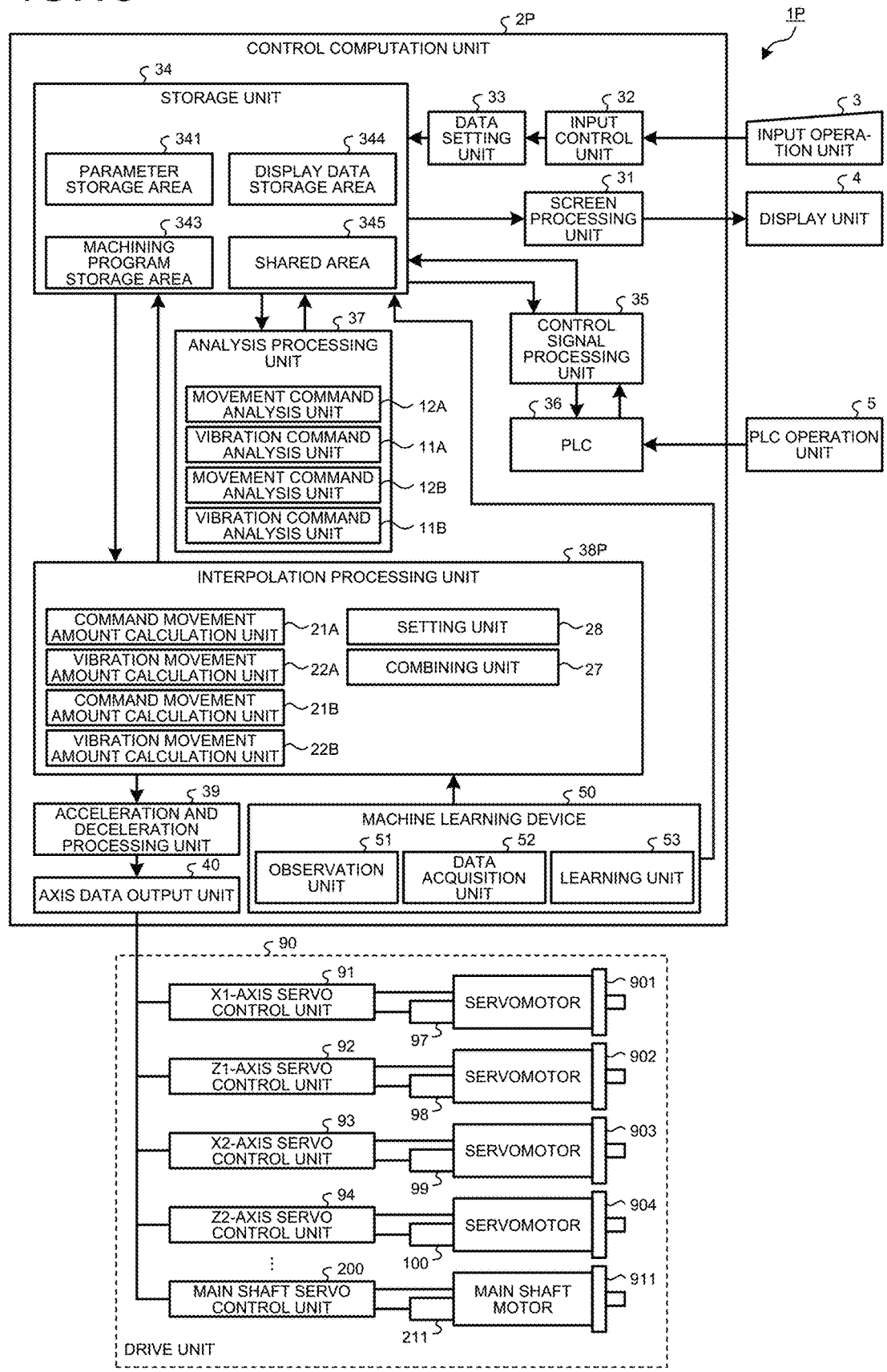
FIG. 15 is a diagram illustrating an exemplary configuration of a numerical control device according to a fourth embodiment.
Figure 16:
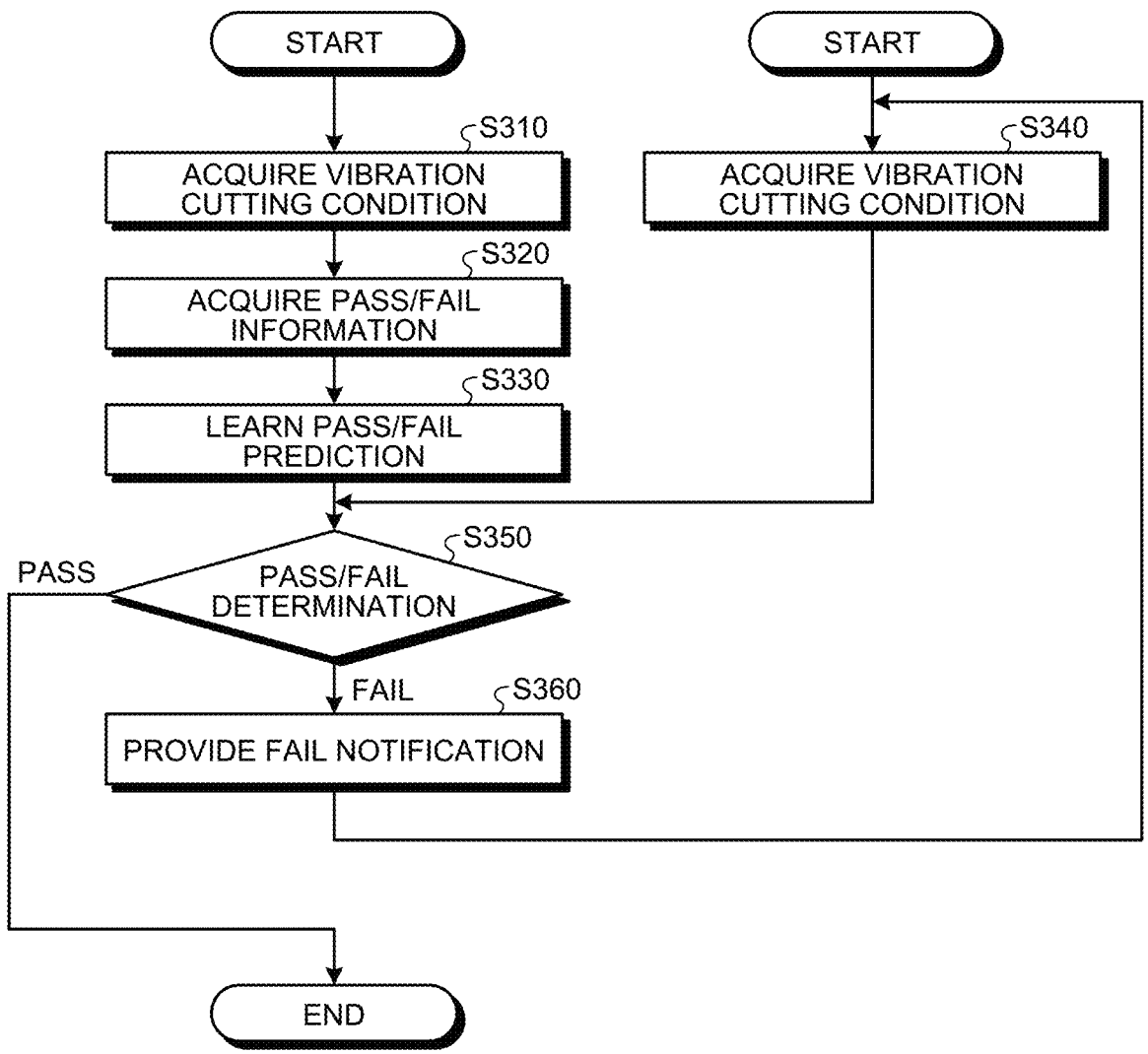
FIG. 16 is a flowchart illustrating a processing procedure for a machine learning device according to the fourth embodiment.

FIG. 15 is a diagram illustrating an exemplary configuration of a numerical control device according to the fourth embodiment. Of constituent elements illustrated in FIG. 15, some that achieve the same functions as those of the numerical control device 1X of the first embodiment illustrated in FIG. 1 are denoted by the same reference signs, and their redundant descriptions are omitted.

The numerical control device 1P is a computer having a configuration similar to that of the numerical control device 1X, and causes the machine tool 110 to execute vibration cutting. Compared with the numerical control device 1X, the numerical control device 1P includes a control computation unit 2P instead of the control computation unit 2X. Compared with the control computation unit 2X, the control computation unit 2P includes an interpolation processing unit 38P instead of the interpolation processing unit 38X. The control computation unit 2P also includes a machine learning device 50. The control computation unit 2P has a hardware configuration similar to that of each of the control computation units 2X to 2Z.

The machine learning device 50 is connected to the storage unit 34 and the interpolation processing unit 38P. The machine learning device 50 includes an observation unit 51, a data acquisition unit 52, and a learning unit 53. In the following description, an input using the machine learning device 50 is denoted by (r), an output using the machine learning device 50 is denoted by (n), and related information used by the machine learning device 50 is denoted by (i).

In the present embodiment, inputs are a state variable (vibration cutting condition described later) and training data (pass/fail information described later), related information is a combination of a state variable and training data (data set described later), and an output is the result of a pass/fail determination of a vibration cutting condition. Any process of writing and reading information between the machine learning device 50 and the analysis processing unit 37 involves the interposition of the storage unit 34, which may be omitted in the following description.

The analysis processing unit 37 analyzes a vibration cutting condition (r) inputted by a user. The observation unit 51 reads the analyzed vibration cutting condition (r) as a state variable from the analysis processing unit 37. The vibration cutting condition (r) read by the observation unit 51 as a state variable is a vibration cutting condition used for the actual machining of the workpiece 70. The vibration cutting condition (r) is conditions for vibration cutting for the spindle 60 and shafts for driving the tools 66A and 66B. Specifically, the vibration cutting condition (r) actually used for the machining of the workpiece 70 is a combination of the number of vibrations information (r), vibration amplitude information (r), and spindle rotation speed information (r), actually used for the machining. Note that the observation unit 51 may read the number of vibrations information (r), vibration amplitude information (r), and spindle rotation speed information (r) from a machining program in the machining program storage area 343. Alternatively, the observation unit 51 may read the number of vibrations information (r), vibration amplitude information (r), and spindle rotation speed information (r) from the interpolation processing unit 38P.

The number of vibrations information (r) is information indicating the number of vibrations of the first shaft 61A and the number of vibrations of the second shaft 61B for vibration cutting. The vibration amplitude information (r) is information indicating the vibration amplitude of the first shaft 61A and the vibration amplitude of the second shaft 61B for vibration cutting. The spindle rotation speed information (r) is information indicating the spindle rotation speed for vibration cutting.

The observation unit 51 observes data on the vibration cutting condition (r) for each system. That is, the observation unit 51 observes, for each of the tool posts 65A and 65B, data on the number of vibrations command, a vibration amplitude command, and a spindle rotation speed command. The observation unit 51 outputs the acquired vibration cutting condition (r) to the learning unit 53.

The data acquisition unit 52 reads pass/fail information (r) that is training data from the shared area 345. The pass/fail information (r) read by the data acquisition unit 52 is information indicating whether the vibration cutting has passed or failed. In other words, the pass/fail information (r) is information indicating whether or not the vibration cutting specified by the machining program has been successfully completed.

The pass/fail information (r) is stored in the shared area 345 based on the user's input after the machining of the workpiece 70 is completed. That is, the pass/fail information (r) is inputted to the numerical control device 1P by the user and stored in the shared area 345. The data acquisition unit 52 outputs the acquired pass/fail information (r) to the learning unit 53.

The learning unit 53 learns a pass/fail prediction (n) corresponding to a vibration cutting condition in accordance with a data set (i) created based on the combination of the vibration cutting condition (r) that is a state variable, and the pass/fail information (r), and makes a pass/fail estimation.

The number of vibrations information (r) and the vibration amplitude information (r) of the vibration cutting condition (r) are included in the vibration cutting command inputted by the user. The spindle rotation speed information (r) is defined by the machining program.

The vibration cutting condition (r) is a vibration cutting condition assessed as pass (appropriate) by the machine learning device 50, or a user-modified version of a vibration cutting condition assessed as fail (inappropriate) by the machine learning device 50.

Compared with the interpolation processing unit 38X, the interpolation processing unit 38P includes a setting unit 28 instead of the determination unit 23 and the number-of-vibrations calculation unit 24. The setting unit 28 sets the vibration cutting condition (r) sent from the machine learning device 50 as conditions for use in vibration cutting, or sets the vibration cutting condition inputted by the user as conditions for use in the vibration cutting. As a result, the setting unit 28 sets a combination of the number of vibrations, a vibration amplitude, and a spindle rotation speed as conditions for use in the vibration cutting. The vibration cutting condition (r) sent from the machine learning device 50 is a vibration cutting condition assessed as "pass" by the machine learning device 50. The vibration cutting condition inputted by the user is a user-modified version of a vibration cutting condition assessed as "fail" by the machine learning device 50.

The interpolation processing unit 38P executes the interpolation processing described in the first to third embodiments based on the combination of the number of vibrations, the vibration amplitude, and the spindle rotation speed which are set by the setting unit 28. That is, the interpolation processing unit 38P executes interpolation processing based on the vibration cutting condition (r) assessed as pass by the machine learning device 50, or on a user-modified version of a vibration cutting condition assessed as fail by the machine learning device 50.

Note that the machine learning device 50 may be a device separate from the numerical control device 1P, which is connected to the numerical control device 1P via a network, for example. Alternatively, the machine learning device 50 may be incorporated in the numerical control device 1P as illustrated in FIG. 15. Still alternatively, the machine learning device 50 may exist on a cloud server.

Here, the learning processing of the learning unit 53 will be described in detail. The learning unit 53 learns the pass/fail prediction (n) for each system through the so-called supervised learning according to, for example, a neural network model. The learning unit 53 learns the pass/fail prediction (n) from the data set in which the vibration cutting condition (r) and the pass/fail information (r) are associated with each other. Here, supervised learning refers to a model that provides a large number of sets of data between inputs and results (labels) to a learning device to thereby learn features in their data sets and estimate a result from an input.

A neural network is constituted by an input layer composed of a plurality of neurons, an intermediate layer (hidden layer) composed of a plurality of neurons, and an output layer composed of a plurality of neurons. The number of intermediate layers may be one, or may be two or more.

For example, in a three-layer neural network, two or more inputs are inputted to the input layer, then the values thereof are multiplied by a first weight and input the results to the intermediate layer, and the results are further multiplied by a second weight and outputted from the output layer. The output results obtained in this way vary depending on the value of the first weight and the value of the second weight.

In the present application, the neural network learns the pass/fail prediction (n) through the so-called supervised learning according to the data set produced based on the combination of the vibration cutting condition (r) observed by the observation unit 51 and the pass/fail information (r) acquired by the data acquisition unit 52. The neural network in this case learns by adjusting the first weight and the second weight so that the result obtained by inputting the vibration cutting condition (r) to the input layer and outputting from the output layer approaches the pass/fail information (r). When receiving a new vibration cutting condition (r) from the user, the neural network makes a pass/fail prediction using the adjusted first and second weights.

The neural network can also learn the pass/fail prediction (n) through the so-called unsupervised learning. Unsupervised learning is a technique for providing only a large amount of input data to the machine learning device 50 to learn how the input data are distributed and learn a device that performs compression, classification, shaping, or the like on the input data without corresponding training data being provided thereto. Features in their data sets can be subjected to clustering into similarities, for example. Using this result, output allocation is performed such that some criterion is set and used for optimization, whereby output prediction can be implemented. A type of problem setting intermediate between unsupervised learning and supervised learning is the so-called semi-supervised learning, which corresponds to a case where only some data sets of inputs and outputs exist and the remainder data sets have only data on inputs.

The learning unit 53 may be configured to learn the pass/fail prediction (n) according to the data sets created for a plurality of numerical control devices. The learning unit 53 may acquire data sets from a plurality of numerical control devices used at the same site, or may learn the pass/fail prediction (n) by using the data sets collected from a plurality of numerical control devices operating independently at different sites.

Further, in the middle of learning, it is possible to add a numerical control device collecting data sets to a coverage, or conversely, to remove a numerical control device from the coverage. In addition, a machine learning device that has learned the pass/fail prediction (n) for a certain numerical control device may be attached to another numerical control device, to relearn and update the pass/fail prediction (n) for the other numerical control device.

As a learning algorithm for use in the learning unit 53, deep learning can be used, which learns extraction of feature amounts themselves. Alternatively, machine learning may be carried out according to another publicly known method such as reinforcement learning, genetic programming, functional logic programming, support vector machine, or the like. The machine learning device 50 may learn the pass/fail prediction (n) for each type of machining such as turning and cutting, drilling, and thread cutting.

Here, a learning processing procedure and a prediction processing procedure which are performed by the machine learning device 50 will be described. FIG. 16 is a flowchart illustrating a processing procedure for the machine learning device according to the fourth embodiment.

The observation unit 51 acquires the vibration cutting condition (r) that is a state variable from the analysis processing unit 37 (step S310). Specifically, the observation unit 51 observes, for each of the tool posts 65A and 65B, data on the number of vibrations command, a vibration amplitude command, and a spindle rotation speed command. The observation unit 51 outputs the acquired vibration cutting condition (r) to the learning unit 53.

The data acquisition unit 52 acquires the pass/fail information (r) that is training data from the shared area 345 (step S320). Note that either a process of step S310 or a process of step S320 may be executed first.

The learning unit 53 learns the pass/fail prediction (n) corresponding to the vibration cutting condition (r) according to the data set (i) created based on the combination of the vibration cutting condition (r) and the pass/fail information (r) (step S330). The learning unit 53 learns the pass/fail prediction (n) using the above-mentioned neural network.

After that, when the user inputs a vibration cutting condition to the numerical control device 1P, the analysis processing unit 37 analyzes the new vibration cutting condition. The machine learning device 50 acquires the analyzed new vibration cutting condition from the analysis processing unit 37 (step S340).

The machine learning device 50 inputs the acquired new vibration cutting condition to the neural network obtained through the learning, and obtains a pass/fail prediction corresponding to the new vibration cutting condition. That is, the machine learning device 50 makes a pass/fail determination of the new vibration cutting condition based on the learned content and the new vibration cutting condition (step S350).

When the new vibration cutting condition is assessed as fail (step S350: fail), the machine learning device 50 notifies the user that the vibration cutting condition has failed (step S360). For example, the machine learning device 50 causes the display unit 4 to display a message indicating that the vibration cutting condition has failed. When the vibration cutting condition has failed, the user modifies the vibration cutting condition. The numerical control device 1P receives the modified vibration cutting condition, and the analysis processing unit 37 analyzes the modified vibration cutting condition. The machine learning device 50 acquires the modified vibration cutting condition from the analysis processing unit 37 (step S340). The machine learning device 50 repeats the processes of steps S340 to S360 until the vibration cutting condition passes.

When the new vibration cutting condition is assessed as pass (step S350: pass), the machine learning device 50 sends the new vibration cutting condition to the setting unit 28 of the interpolation processing unit 38P. As a result, the setting unit 28 sets the new vibration cutting condition as a condition for use in the vibration cutting. The numerical control device 1P controls the vibration cutting using the newly set vibration cutting condition.

After the vibration cutting is completed, the user determines whether or not the vibration cutting has been executed properly. The user assesses the vibration cutting as pass when chips separated through the vibration cutting are successfully short on average, whereas the user assesses the vibration cutting as fail when chips separated through the vibration cutting are long or have large variations in length.

The user inputs, to the numerical control device 1P, the pass/fail information (r) indicating whether the vibration cutting has passed or failed. The pass/fail information (r) is stored in the shared area 345. After that, the machine learning device 50 learns the pass/fail prediction (n) for a combination of the new vibration cutting condition (r) and the pass/fail information (r) corresponding to the new vibration cutting condition. That is, the machine learning device 50 learns the pass/fail prediction (n) for the new vibration cutting condition through the processes of steps S310 to S330 described above. Specifically, the observation unit 51 acquires, as a state variable, the new vibration cutting condition (r) used for the vibration cutting from the analysis processing unit 37. The data acquisition unit 52 acquires, as training data, the pass/fail information (r) corresponding to the new vibration cutting condition (r) from the shared area 345 (step S320). The learning unit 53 learns the pass/fail prediction (n) corresponding to the new vibration cutting condition (r) according to the data set (i) created based on the combination of the new vibration cutting condition (r) and the new pass/fail information (r) (step S330).

When the user inputs the next vibration cutting condition to the numerical control device 1P, the machine learning device 50 makes a pass/fail prediction for the next vibration cutting condition through the processes of steps S340 to S360 described above. In the numerical control device 1P, the machine learning device 50 repeatedly learns the pass/fail prediction (n) and makes a pass/fail prediction for the new vibration cutting condition (r).

Note that the user may give a score to a vibration cutting result, and the machine learning device 50 may learn the score with respect to the vibration cutting condition. The score is higher as the shorter chip length is obtained with respect to variation cutting and as the smaller variations in length of chips are obtained. The user inputs the vibration cutting condition (r) and the score (r) to the numerical control device 1P in association with each other. The observation unit 51 acquires the vibration cutting condition (r) that is a state variable from the analysis processing unit 37, and the data acquisition unit 52 acquires the score (r) that is training data, from the shared area 345.

The learning unit 53 learns the score (n) corresponding to the vibration cutting condition (r) according to the data set (i) created based on the combination of the vibration cutting condition (r) and the score (r). The learning unit 53 learns the score (n) using the above-mentioned neural network. When receiving a new vibration cutting condition from the user, the machine learning device 50 inputs the acquired new vibration cutting condition to the neural network obtained through the learning, and obtains a score corresponding to the new vibration cutting condition. The machine learning device 50 causes the display unit 4 to display the calculated score.

Note that the machine learning device 50 may calculate the score (r) based on a captured image of chips or the like. In this case as well, the machine learning device 50 makes the score such that the score is higher as the length of chips for the vibration cutting is shorter and the score is higher as the variations in length of chips are smaller. The machine learning device 50 may be applied to the numerical control device 1Y of the second embodiment or the numerical control device 1Z of the third embodiment.

As described above, according to the fourth embodiment, the machine learning device 50 learns whether or not a combination of the number of vibrations, the vibration amplitude, and the spindle rotation speed is an appropriate combination for the vibration cutting. This enables the user to easily determine whether or not the combination of the number of vibrations, the vibration amplitude, and the spindle rotation speed, which are scheduled to be used is appropriate for the vibration cutting.

In the above-described exemplary embodiments, the machine tool has two tool posts, but the present invention can be applied to a machine tool having one tool post or a machine tool having three or more tool posts.

The configurations described in the above-mentioned embodiments illustrate examples of the contents of the present invention, and can each be combined with other publicly known techniques and partially omitted and/or modified without departing from the scope of the present invention.

REFERENCE SIGNS LIST 1P, 1X to 1Z numerical control device; 2P, 2X to 2Z control computation unit; 3 input operation unit; 4 display unit; 5 PLC operation unit; 11A, 11B vibration command analysis unit; 12A, 12B movement command analysis unit; 21A, 21B command movement amount calculation unit; 22A, 22B vibration movement amount calculation unit; 23 determination unit; 24 the number-of-vibrations calculation unit; 25 spindle rotation speed calculation unit; 26 standby control unit; 27 combining unit; 28 setting unit; 34 storage unit; 37 analysis processing unit; 38P, 38X to 38Z interpolation processing unit; 50 machine learning device; 51 observation unit; 52 data acquisition unit; 53 learning unit; 60 spindle; 61A first shaft; 61B second shaft; 65A, 65B, 65C tool post; 66A, 66B tool; 70 workpiece; 81P, 81Q, 82P, 82Q, 83P, 83Q, 84, machining program; 90 drive unit; 110, 111 machine tool.

The invention claimed is:

1. A numerical control device comprising:
control computation circuitry to control a spindle that is a rotation axis of a machining target,
first drive shaft to drive a first tool to perform vibration cutting machining on the machining target, and
second drive shaft to drive a second tool to perform vibration cutting machining on the machining target, wherein:
the control computation circuitry comprises:
a memory to store a machining program for performing vibration cutting machining on the machining target;
determination circuitry to determine whether the numbers of vibrations of the first drive shaft and the second drive shaft follow a first spindle rotation speed that is a rotation speed of the spindle specified by the machining program; and
number-of-vibrations calculation circuitry to, in response to the determination circuitry determining that the number of vibrations of the first drive shaft follows the first spindle rotation speed and the number of vibrations of the second drive shaft does not follow the first spindle rotation speed, change the rotation speed of the spindle from the first spindle rotation speed to a third spindle rotation speed,
the third spindle rotation speed has a value between the first spindle rotation speed and a second spindle rotation speed, and
the second spindle rotation speed is calculated on the basis of: a first vibrational frequency calculated based on the first spindle rotation speed and the number of vibrations of the first drive shaft; and the number of vibrations of the second drive shaft.

2. The numerical control device according to claim 1, wherein:
the third spindle rotation speed has a value which the numbers of vibrations of the first drive shaft and the second drive shaft follow.

3. The numerical control device according to claim 1, wherein:
the third spindle rotation speed has a value between an intermediate value of the first spindle rotation speed and the second spindle rotation speed and the second spindle rotation speed.

4. The numerical control device according to claim 1, wherein:
the third spindle rotation speed has an intermediate value of the first spindle rotation speed and the second spindle rotation speed.

5. The numerical control device according to claim 1, wherein:
the control computation circuitry changes at least one of the number of vibrations of the first drive shaft, the number of vibrations of the second drive shaft, and the rotation speed of the spindle at a timing when neither the first tool nor the second tool is performing vibration cutting.

6. The numerical control device according to claim 1, wherein:
the control computation circuitry causes at least one of the first drive shaft and the second drive shaft to perform vibration cutting in a cutting direction that is not parallel to the spindle.

7. A numerical control method for controlling a spindle that is a rotation axis of a machining target, a first drive shaft to drive a first tool to perform vibration cutting machining on the machining target, and a second drive shaft to drive a second tool to perform vibration cutting machining on the machining target, the numerical control method comprising:
a determination step of determining whether the numbers of vibrations of the first drive shaft and the second drive shaft follow a first rotation speed that is a rotation speed of the spindle specified by a machining program for performing vibration cutting machining on the machining target; and
a changing step of, in response to determining in the determination step that the number of vibrations of the first drive shaft follows the first spindle rotation speed and the number of vibrations of the second drive shaft does not follow the first spindle rotation speed, changing the rotation speed of the spindle from the first spindle rotation speed to a third spindle rotation speed,
the third spindle rotation speed has a value between the first spindle rotation speed and a second spindle rotation speed, and
the second spindle rotation speed is calculated on the basis of: a first vibrational frequency calculated based on the first spindle rotation speed and the number of vibrations of the first drive shaft; and the number of vibrations of the second drive shaft.

* * * * *